(12) United States Patent
Varadan et al.

(10) Patent No.: US 11,153,412 B1
(45) Date of Patent: Oct. 19, 2021

(54) SYSTEMS AND/OR METHODS FOR NON-INTRUSIVE INJECTION OF CONTEXT FOR SERVICE MESH APPLICATIONS

(71) Applicant: Software AG, Darmstadt (DE)

(72) Inventors: Madhavan Kidambi Varadan, Chennai (IN); Praveen Kumar Vaidyanathan, Chennai (IN); Malligarjunan Sidduraj, Chennai (IN)

(73) Assignee: SOFTWARE AG, Darmstadt (DE)

( * ) Notice: Subject to any disclaimer, the term of this patent is extended or adjusted under 35 U.S.C. 154(b) by 0 days.

(21) Appl. No.: 17/002,896

(22) Filed: Aug. 26, 2020

(51) Int. Cl.
*H04L 29/08* (2006.01)
*H04L 29/06* (2006.01)
*H04L 29/12* (2006.01)
*G06F 16/955* (2019.01)
*H04L 12/66* (2006.01)

(52) U.S. Cl.
CPC ............ *H04L 67/40* (2013.01); *G06F 16/955* (2019.01); *H04L 12/66* (2013.01); *H04L 61/2517* (2013.01); *H04L 67/16* (2013.01); *H04L 67/327* (2013.01)

(58) Field of Classification Search
CPC ... H04L 67/40; H04L 67/327; H04L 61/2517; H04L 67/16; H04L 12/66; G06F 16/955
See application file for complete search history.

(56) References Cited

U.S. PATENT DOCUMENTS

| | | | | |
|---|---|---|---|---|
| 2003/0110172 | A1* | 6/2003 | Selman | H04L 67/36 |
| 2004/0015408 | A1* | 1/2004 | Rauen, IV | G06Q 30/0613 |
| | | | | 705/26.41 |
| 2004/0054748 | A1* | 3/2004 | Ackaouy | G06F 16/10 |
| | | | | 709/214 |
| 2006/0036747 | A1* | 2/2006 | Galvin, Jr. | H04L 69/40 |
| | | | | 709/228 |
| 2008/0016339 | A1* | 1/2008 | Shukla | G06F 21/566 |
| | | | | 713/164 |
| 2008/0282254 | A1* | 11/2008 | Blander | H04L 65/1006 |
| | | | | 718/105 |

(Continued)

OTHER PUBLICATIONS

Kubernetes—Pods, electronically retrieved Aug. 25, 2020, 5 pages. https://kubernetes.io/docs/concepts/workloads/pods/.

(Continued)

*Primary Examiner* — Aftab N. Khan
(74) *Attorney, Agent, or Firm* — Nixon & Vanderhye PC

(57) ABSTRACT

Certain example embodiments relate to service mesh management. A service mesh proxy routes incoming requests to one or more microservices in a container. At least one microservice has one or more associated API twins, each definable to enforce a policy based on application-level context information unavailable from incoming requests. A microgateway hosting the API twin(s) is instantiated and is configurable to automatically and transparently ensure that (a) incoming requests that otherwise would be directed to an end microservice having one or more associated API twins will be re-directed to an appropriate one of these one or more API twins en route to the end microservice, and (b) outgoing responses that otherwise would be directed by each such end microservice to the service mesh proxy will be re-routed to the microgateway en route to the service mesh proxy. Incoming requests' structures are unchanged pre- and post-microgateway runtime.

22 Claims, 19 Drawing Sheets

(56) References Cited

U.S. PATENT DOCUMENTS

| | | | | |
|---|---|---|---|---|
| 2010/0333111 | A1* | 12/2010 | Kothamasu | H04L 51/14 |
| | | | | 719/313 |
| 2014/0059226 | A1* | 2/2014 | Messerli | H04L 47/783 |
| | | | | 709/226 |
| 2016/0352588 | A1* | 12/2016 | Subbarayan | H04L 67/32 |
| 2019/0273746 | A1* | 9/2019 | Coffing | H04L 63/105 |
| 2020/0162380 | A1* | 5/2020 | Pilkington | H04L 45/70 |
| 2020/0322273 | A1* | 10/2020 | Natal | H04L 67/10 |

OTHER PUBLICATIONS

Docker—What is a Container? electronically retrieved Aug. 25, 2020, 4 pages. https://www.docker.com/resources/what-container.

Istio 1.7—Docs Tasks, electronically retrieved Aug. 25, 2020, 1 page. https://istio.io/latest/docs/tasks/.

Istio 1.7, electronically retrieved Aug. 25, 2020, 3 pages. https://istio.io/.

Linkerd, electronically retrieved Aug. 25, 2020, 2 pages. https://linkerd.io/.

AWS App Mesh—Application-level Networking for All Your Services, electronically retrieved Aug. 25, 2020, 14 pages. https://aws.amazon.com/app-mesh/.

Kuma, electronically retrieved Aug. 25, 2020, 7 pages. https://kuma.io/.

Kubernetes, electronically retrieved Aug. 25, 2020, 6 pages. https://kubernetes.io/.

Software AG—API Management, electronically retrieved Aug. 25, 2020, 12 pages. https://www.softwareag.com/en_corporate/platform/integration-apis/api-management.html.

* cited by examiner

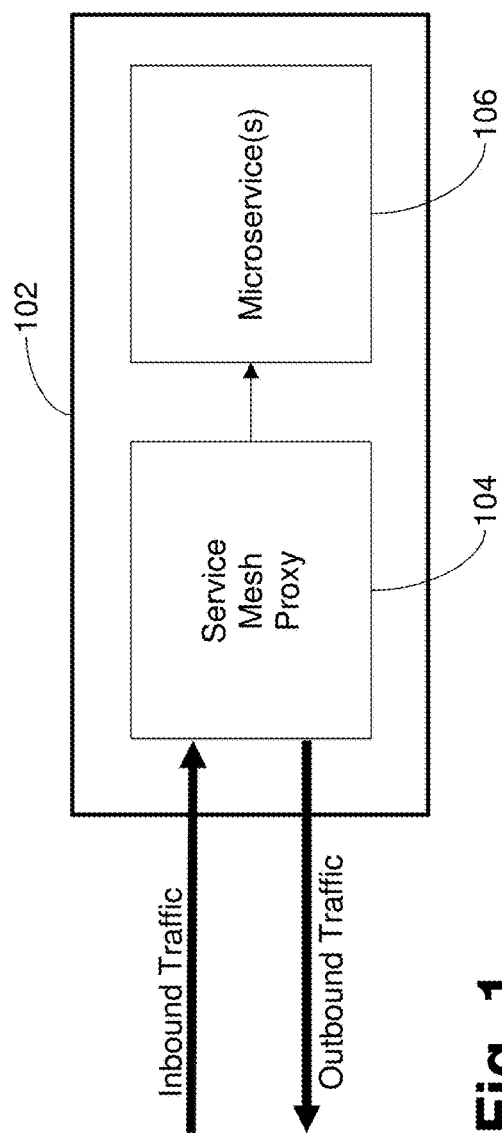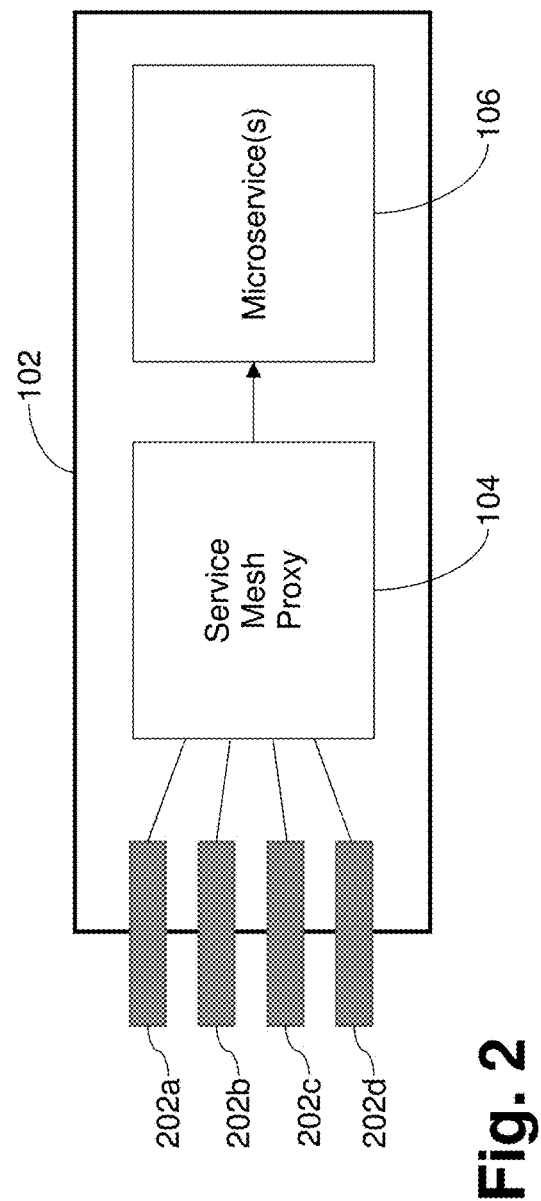

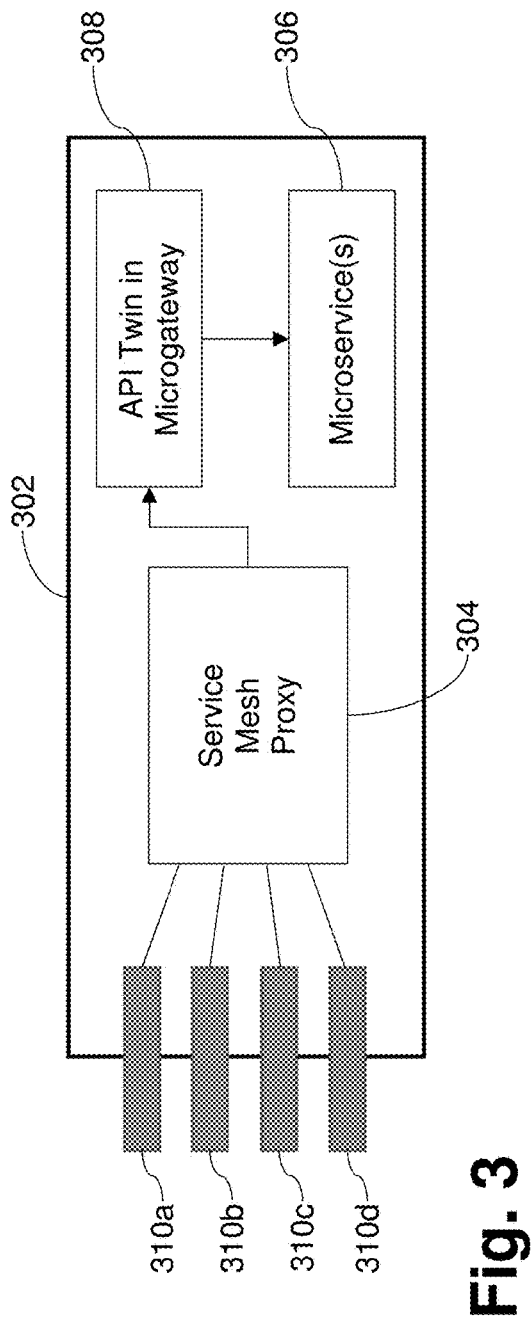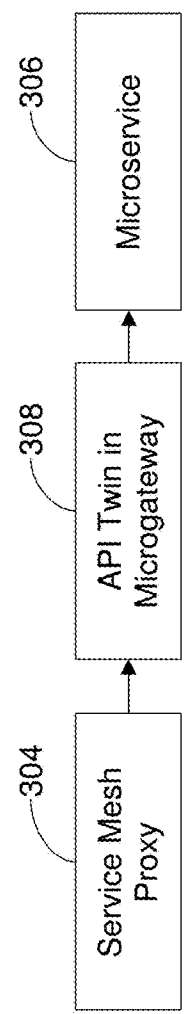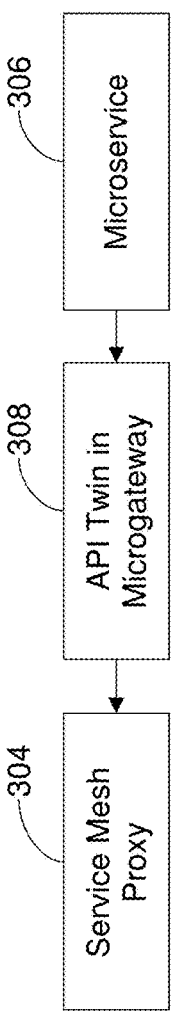
Fig. 3
Fig. 4
Fig. 5

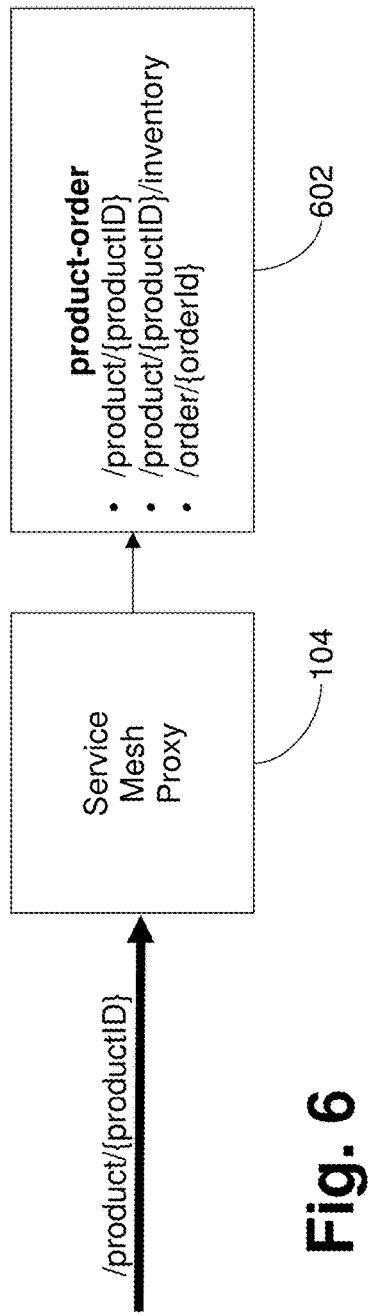
Fig. 6
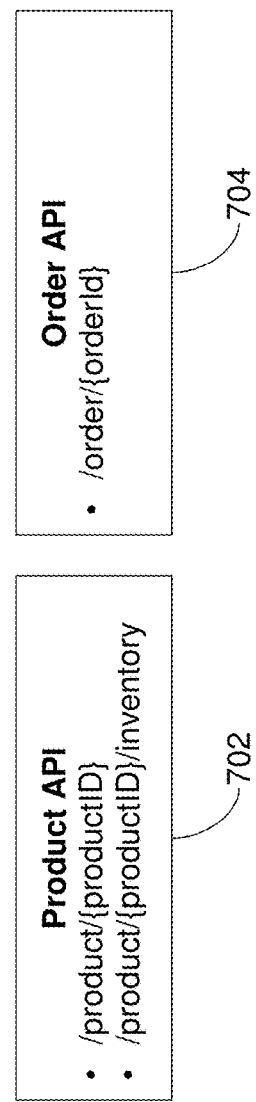
Fig. 7
/gateway /Product API/product/{productID}
<Microgateway Context> <API Twin name> <Microservice URL>
Fig. 8

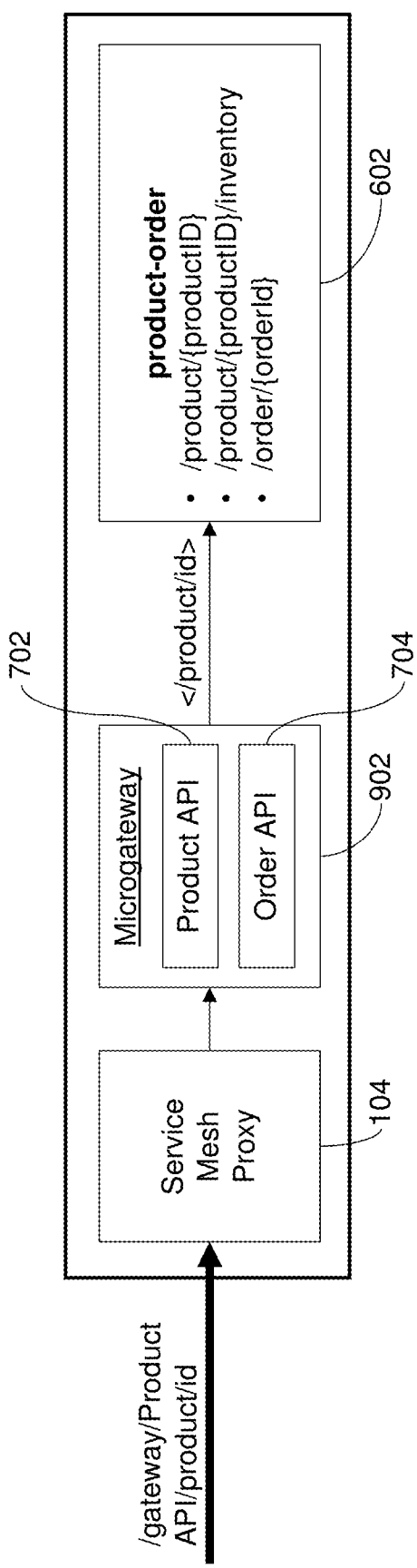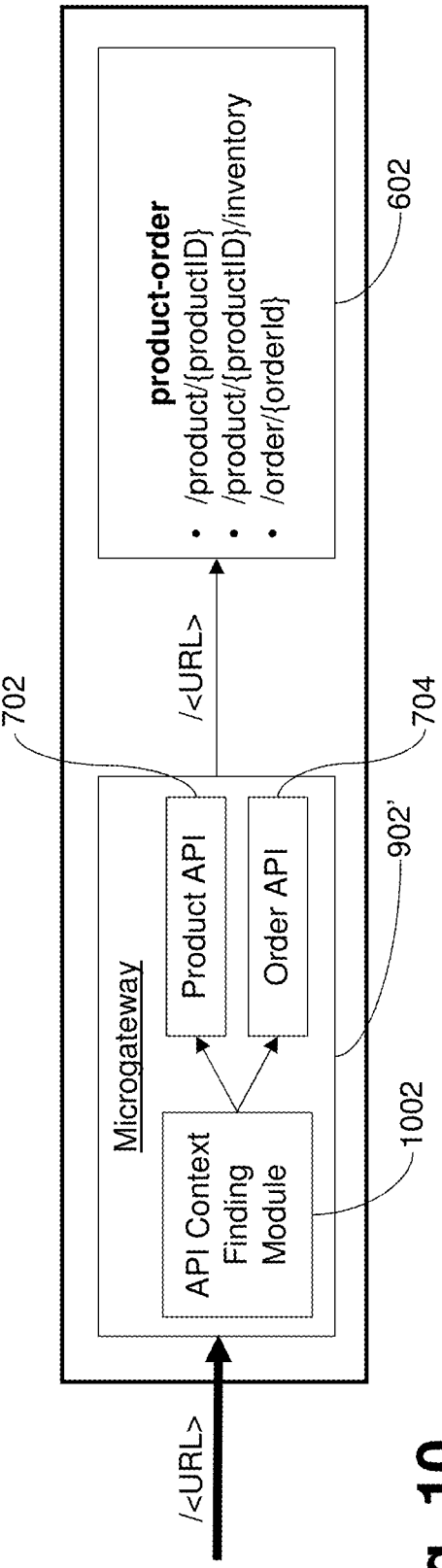

Basic information

Deployment Name    product-service
Namespace          default
Endpoints          http://localhost:9092
External Endpoints http://10.0.2.15:30758

Fig. 11

```
1.  {
2.     "openapi" : "3.0.1",
3.     "info" : {
4.        "title" : "louisvuitton-adapter",
5.        "version" : "1.0"
6.     },
7.     "servers" : [ {
8.        "url" : "http://192.145.12.45:9000/product-service/products/"
9.     } ],
10.    "paths" : {
11.       "/products/" : {
12.          "summary" : "/products/",
13.          "get" : {
14.             "parameters" : [ ],
15.             "responses" : {
16.                "200" : {
17.                   "description" : "",
18.                   "headers" : { },
19.                   "content" : {
20.                      "application/json" : {
21.                         "schema" : { },
22.                         "example" : "{\n}"
23.                      }
24.                   },
25.                   "links" : { }
26.                }
27.             }
28.          },
29.          "parameters" : [ ]
30.       },
31.       "/products/{id}" : {
32.          "summary" : "/products/{id}",
33.          "get" : {
34.             "parameters" : [ {
35.                "name" : "location",
36.                "in" : "query",
37.                "required" : false,
38.                "allowEmptyValue" : false,
39.                "schema" : {
40.                   "type" : "string"
41.                }
42.             }, {
43.                "name" : "gender",
44.                "in" : "query",
45.                "description" : "Gender ",
```

Fig. 23A

```
46.            "required" : true,
47.            "allowEmptyValue" : false,
48.            "schema" : {
49.              "type" : "string"
50.            }
51.          }, {
52.            "name" : "id",
53.            "in" : "path",
54.            "required" : true,
55.            "allowEmptyValue" : false,
56.            "schema" : {
57.              "type" : "string"
58.            }
59.          } ],
60.          "responses" : {
61.            "200" : {
62.              "description" : "",
63.              "headers" : { },
64.              "content" : {
65.                "application/json" : {
66.                  "schema" : {
67.                    "type" : "object"
68.                  },
69.                  "examples" : { }
70.                }
71.              },
72.              "links" : { }
73.            }
74.          }
75.        },
76.        "parameters" : [ ]
77.      }
78.    },
79.    "components" : {
80.      "schemas" : { },
81.      "responses" : { },
82.      "parameters" : { },
83.      "examples" : { },
84.      "requestBodies" : { },
85.      "headers" : { },
86.      "links" : { },
87.      "callbacks" : { }
88.    }
89.  }
```

| Data Masking | | |
| --- | --- | --- |
| Consumer Applications | | |
| AmericanApp | | |
| ⊙ JSON Path | | |
| Masking Criteria | | |
| Query Expression | Masking Type | Mask Value |
| $.currency | Mask | USD |
| Apply for transaction logging | | |
| True | | |
| Apply for payload | | |
| True | | |

SYSTEMS AND/OR METHODS FOR NON-INTRUSIVE INJECTION OF CONTEXT FOR SERVICE MESH APPLICATIONS

TECHNICAL FIELD

Certain example embodiments described herein relate to techniques used in applications that incorporate service meshes for microservices. More particularly, certain example embodiments described herein relate to techniques for non-intrusively injecting context into applications that use service meshes and microservices.

BACKGROUND AND SUMMARY

Microservice architecture may be thought of as being a variant of the service-oriented architecture (SOA) architectural style, which structures an application as a collection of loosely-coupled services. In microservice architectures, services typically are fine-grained and protocols typically are lightweight. Potential benefits of decomposing an application into different smaller services include the ability to improve modularity, and the ability to make applications easier to understand, develop, and test. Microservice-based architectures can enable continuous delivery and deployment so that applications can emerge over time, e.g., through independent and modular development.

Microservices can be used in a variety of computer-based applications and infrastructures. For example, microservice architectures have become key enablers of cloud computing. Cloud computing refers generally to an information technology paradigm that enables access to shared pools of configurable system resources and higher-level services that can be rapidly provisioned with little management effort, oftentimes using distributed computing systems and oftentimes over the Internet. Cloud computing generally relies on the sharing of resources to achieve coherence and the ability to scale, potentially dynamically, to address requests from requesting computing systems and the like. Cloud computing has become more and more ubiquitous, especially as microservice architectures have gained in popularity.

Microservices continue to be rapidly adopted in a variety of different computing contexts, from comparatively simple small-scale to very large-scale and technologically complex deployments. Technologies that enable microservice development, operation, and management have also been evolving at a rapid pace. Although technologies such as containerization, DevOps (which refers to a set of practices that combines software development and Information Technology (IT) operations), service mesh, and the like, have simplified microservice adoption to a great extent, microservice-enabling technologies continue to evolve, and there is a continued need to facilitate this evolution. Indeed, it would be desirable to enable the convergence of service mesh, application programming interface (API) management and integration technologies to solve technical problems that organizations of different sizes, scales, verticals, environments, regions, operational complexities, etc., can encounter.

It will be appreciated from the above that microservice-based architectures advantageously can provide agility and more flexibility for application developers. Unfortunately, however, they also can introduce higher operational complexity for application developers and operations teams. For example, as a general rule, as the number of microservices in an application increases, the operational complexity also tends to increase proportionally.

A service mesh is a dedicated infrastructure layer for handling service-to-service communication, and a service mesh typically is implemented as an array of lightweight network proxies that are deployed alongside application code. A typical service mesh platform provides functionality including service discovery, observability, fault tolerance, connectivity across different protocols, and security and other network level enforcements. A service mesh and its components therefore can help relieve application developers from having to handle operation level challenges, potentially freeing them up to solve other technical challenges on the part of an organization. Service meshes therefore can aid in microservice deployments.

A typical service provides this functionality through a service mesh proxy that resides in close proximity to the microservice(s). Inbound traffic to the microservice(s) and outbound communications from the microservice(s) are intercepted by the proxy at the network level in a non-intrusive way. The interception is non-intrusive in the sense that the microservice(s) typically will not be aware of the interception that happens in the network layer using the proxy. As a result, "enforcements" can be done by the proxy without impacting the overall application. Using a typical service mesh, it is possible to avoid changing URLs that the clients use to call microservices, for example, even though the traffic is intercepted by the proxy.

FIG. 1 is a simplified block diagram of a typical service mesh environment or pod 102. A pod, in general, is a group of one or more containers, with shared storage and/or network resources, and a specification (e.g., computer-based instructions and/or definitions) for how to run the container. It is the smallest deployable unit of computing that you can be created and managed in Kubernetes, for example. A container is a standard unit of software that packages up code and its dependencies so the application runs quickly and reliably from one computing environment to another. As can be seen, inbound and outbound traffic are received via the service mesh proxy 104, which is provided in close proximity to the microservice(s) 106.

FIG. 2 is a simplified block diagram showing the FIG. 1 environment 102 that makes use of node ports (not explicitly shown) and cluster ports 202a-202d, for example. External and internal access to the pod is defined with the help of these node ports and cluster ports 202a-202d. In deployments where node ports and cluster ports are used, cluster ports typically allow access to the service for the apps/services within the cluster only and provide no external access. Node ports, on the other hand, typically provide a way to route external traffic directly to a service via the cluster ports. Kubernetes is an example open-source container-orchestration system, and Kubernetes deployments typically employ this general approach.

As explained above, although microservice architectures provide agility and more flexibility, they also introduce higher operational complexity on the part of application developers and operations teams. And as the number of microservices in an application increases, the operational complexity also increases proportionally. A environment might have with hundred or even thousands of microservices (which is not so uncommon these days), so an application developer would consider, in addition to how best to construct the application developer's own logic, how these services are going to find each other, how these services are going to securely connect to each other, how these services are going to detect failures and do a retry, how the application logs/monitors/traces the service calls, etc. Service developers can still code this additional logic in each of these services, but it certainly would be desirable to avoid having to do so given the volume of services and the fact that doing so likely would detract from the time allotted to developing the core logic for the organization. Service mesh platforms can be very useful when managing complex microservices landscapes in that they sometimes can help solve technical challenges. For example, service mesh platforms in some instances can help address the above-described technical challenges. A service mesh and its components can do the required "heavy lifting" by relieving application developers from focusing on the aforementioned challenges. Unfortunately, however, such tools are not always application- or context-aware. Indeed, it will be appreciated that proxies and other service mesh components oftentimes do not really have any knowledge of the microservices they proxy and protect. For these proxies, the microservices are in essence a black box. Very little, and perhaps even the bare minimum, amount of information typically is known to the proxies, so they are restricted in what they can do based on this lack of information. Although the service mesh, via service mesh proxies, are able to route traffic and automatically start new instances of microservices if required, they do not have this type of information and therefore are unable to support policies and content-based actions. Policies may be thought of as being a set of rules/actions that are enforced/performed in a service's request/response flow.

Because of the lack of application- and/or context-awareness in particular, current service mesh platforms cannot adequately address a number of application developer concerns. For example, application developers might want to create some "application level" enforcements (e.g., make a routing decision based on the request data, mask a certain value in the payload based on the identified user before they reach the microservices, automatically convert the currency field of the service response based on geographical location of the user, etc.). The service mesh might not provide functionality to fulfill these and/or other purposes. Challenges also might exist if there is a desire to use the microservices to drive an application integration. These microservices services cannot work in isolation and should be integrated to realize their full value or potential. Yet current service mesh platforms unfortunately do not make this type of integration easy. Application developers might also wonder how to prepare microservices for adoption and reuse when there is a lack of knowledge about the service interface and the functions they provide. In a similar vein, there are concerns about how to prepare microservices for consumption in the absence of detailed application- and context-aware information.

Certain example embodiments help address the above-described and/or other concerns. For example, certain example embodiments improve service mesh tools and enable them to address these application-level problems, e.g., by making available application-level context information. In so doing, it becomes possible to enable microservices to be better utilized and provide additional value to the overall organization. To provide application-level context, for example, certain example embodiments provide a component that is aware of the microservice(s) it is proxying. This is performed in certain example embodiments by creating an "API twin" for the microservice, enriching the service definition, applying API policies, packaging/deploying the API twin into a microgateway, and deploying this package as a "sidecar."

As will become clearer from the description below, an API twin in accordance with certain example embodiments can in essence be seen as a logical representation of the microservice with enriched API definitions detailing the microservice's interface, documentation, and policy enforcements. Moreover, an API twin can in certain example instances be seen as a virtual service (to the microservice) that simply intercepts the traffic that is bound to the microservice, enforces policies/rules, and then routes the traffic to the microservice. Because the API twin is created with the service definition of the microservice in certain example embodiments, the API twin is aware of the methods/functions/operations that the microservice supports. This improved awareness improves the underlying tool and allows for the enforcement of granular policies/rules (e.g., authentication such as, for example, via mutual TLS and JWT claim based authentication; data transformation such as, for example, via request/response payload transformation and data masking; advanced routing such as, for example, via content/context based routing; monitoring; API key; etc.) on the inbound/outbound traffic in/out of the microservice, potentially without requiring any changes to the microservice. Certain example embodiments advantageously improve the underlying tool by enabling application-level enforcements without requiring changes to the microservice.

The microgateway may be implemented as a variant of the assignee's webMethods API Gateway, in certain example implementations. The microgateway thus may be a policy enforcement point where the API twin is deployed, and where the associated policies are executed, at least in certain example embodiments. The microgateway helps provide security, governance, monitoring, etc., to the microservices landscape. It advantageously has a very small memory footprint, multiple deployable form factors (e.g., side car, standalone, etc.) and very fast startup times (on the order of seconds or potentially less in certain example embodiments). In certain example embodiments, the microgateway can have the same codebase (or a simplified version of the same codebase such as a lightweight version or micro-version of the codebase) as an API gateway or controller. Thus, in certain example embodiments, if the microgateway hosting the API twin(s) can simply retrieve the API policy definitions, the API twin(s) can run the APIs in the same way. Advantageously, the microgateway itself need not necessarily have information about the microservice itself; instead, it can resolve this information based on the incoming URL or other call command by itself.

Certain example embodiments relate to an environment that helps manage a mesh of microservices, offering capabilities such as discovery, load balancing, failure recovery, metrics, and monitoring, etc., while also providing insight into what the microservice offers. Providing this insight advantageously can facilitate the preparation of microservices for adoption and reuse, the application of application- or other-level enforcements, use of the microservices in integrations, etc.

In certain example embodiments, a method of managing a service mesh is provided. A service mesh proxy is configured to route incoming requests to one or more microservices provided in a container pod. For at least one of the one or more microservices, at least one API twin to be associated therewith is defined. Each API twin is definable to access application-level context information unavailable from the incoming requests and to enforce a policy based thereon. A microgateway container is instantiated for deployment within the container pod. The microgateway container, via instantiation, automatically pulls a definition for each API twin so as to enable policy enforcement for the associated microservice. The microgateway container, once deployed, is configurable to (a) automatically modify operation of the service mesh proxy to ensure that incoming requests that otherwise would be directed by the service mesh proxy to an end microservice having one or more API twins associated therewith instead will be automatically re-directed by the service mesh proxy to an appropriate one of these one or more API twins en route to the end microservice, and (b) automatically modify operation of each end microservice having one or more API twins associated therewith to ensure that outgoing responses therefrom that otherwise would be directed by each such end microservice to the service mesh proxy instead will be automatically re-routed to the microgateway en route to the service mesh proxy, wherein (a) and (b) are transparent to requestors. Incoming requests to the service mesh proxy have a first expected structure that is unchanged pre- and post-microgateway container runtime.

In certain example embodiments, there is provided a method of operating a computing environment including a service mesh having a service mesh proxy configured to route incoming requests to one or more microservices provided in a container pod. The one or more microservices provide an application usable via the computing environment. The method comprises having a container pod. The container pod is automatically configured to include a microgateway container and at least one API twin hosted within the microgateway container. The definition of each API twin associates the respective API twin with one of the one or more microservices. Each API twin is operable to enforce a policy based on application-level context information retrieved by the respective API twin but unavailable from the incoming requests. The microgateway container is run so as to, in accordance with the configuration thereof, automatically modify operation of (a) the service mesh proxy to ensure that incoming requests that otherwise would be directed by the service mesh proxy to an end microservice having one or more API twins associated therewith instead will be automatically re-directed by the service mesh proxy to an appropriate one of these one or more API twins en route to the end microservice, and (b) each end microservice having one or more API twins associated therewith to ensure that outgoing responses therefrom that otherwise would be directed by each such end microservice to the service mesh proxy instead will be automatically re-routed to the microgateway en route to the service mesh proxy, wherein (a) and (b) are transparent to requestors. Incoming requests to the service mesh proxy have a predefined structure that is unchanged pre- and post-microgateway container runtime.

According to certain example embodiments, (a) and (b) may be performed during microgateway container startup, e.g., by changing port assignments included in a container pod definition.

According to certain example embodiments, the first expected structure may include a URL and, for example, the microgateway container may be configured to route requests to an appropriate API twin based on path information extracted from a URL in a request.

According to certain example embodiments, outgoing responses from the service mesh proxy may have a second expected structure that is unchanged pre- and post-microgateway container runtime.

According to certain example embodiments, the microgateway container instantiation may include modifying a container pod definition.

According to certain example embodiments, the microgateway container may be connected to a master controller API gateway.

Systems for implementing these methods also may be provided. For example, a service mesh management system operable in connection with a service mesh proxy configured to route incoming requests to one or more microservices provided in a container pod may include at least one processor and a memory, the at least one processor storing instructions executable by the at least one processor to perform operations for implementing these methods may be provided. Computing environments likewise may be provided, e.g., for operating API gateways, container pods, microgateway containers, etc. In a similar vein, certain example embodiments relate to non-transitory computer readable storage media that, when executed by a computer or computing system, are configured to perform the functionality described herein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a simplified block diagram of a typical service mesh environment or pod;

FIG. 2 a simplified block diagram showing the FIG. 1 environment making use of node ports and cluster ports;

FIG. 3 is a simplified block diagram of a service mesh environment in accordance with certain example embodiments;

FIG. 4 shows a sample inbound traffic flow in accordance with certain example embodiments;

FIG. 5 shows a sample outbound traffic flow in accordance with certain example embodiments;

FIG. 6 is a block diagram showing an example product-order microservice prior to the injection of a microgateway with API twins;

FIG. 7 is a block diagram showing two API twins that could be injected into a microgateway to enhance the FIG. 6 example microservice, in accordance with certain example embodiments;

FIG. 8 shows the general structure of a URL for the FIG. 6 microservice, after microgateway injection, in accordance with certain example embodiments;

FIG. 9 is a block diagram showing the injected microgateway with the FIG. 7 example API twins in the enhanced FIG. 6 microservice, in accordance with certain example embodiments;

FIG. 10 is a block diagram showing the non-intrusive deployment of a microgateway 902', in accordance with certain example embodiments;

FIG. 11 is a screenshot showing minimal configuration information of the FIG. 6 example microservice from the service mesh;

FIGS. 23A-23B provide a code snippet of an OpenAPI specification of the Brand LV example microservice, which may be used in certain example embodiments;

FIG. 24 is an example screenshot showing the basic information provided for an American App application usable in connection with the Brand LV microservice, in accordance with certain example embodiments;

FIG. 25 is an example screenshot showing an example response transformation policy being defined, in accordance with certain example embodiments; and FIG. 26 shows the URL call with the API key and the transformation in place, in accordance with certain example embodiments.

DETAILED DESCRIPTION

Figure 12:
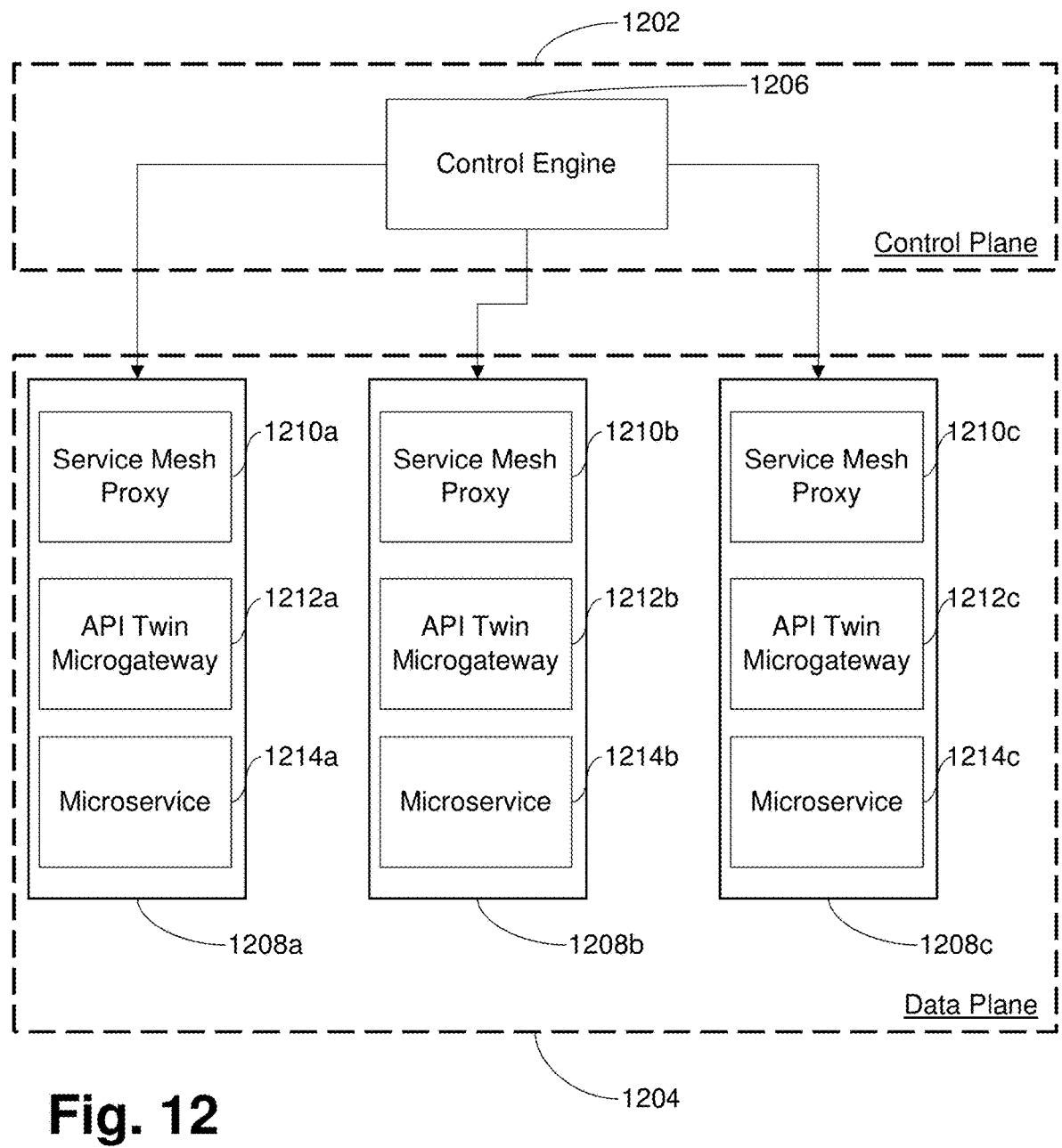
FIG. 12 is a block diagram showing the automatic injection of API twin inclusive microgateways into service meshes, in accordance with certain example embodiments.

Certain example embodiments provide an approach for the non-intrusive injection of application or other level context for service meshes that involve one or more microservices. To provide application-level context, for example, certain example embodiments provide a component that is aware of the microservice(s) it is proxying. Providing this structure advantageously helps grant visibility into what microservices offer in terms of functionality, offers improved control and monitoring of the traffic into and out from the services, and aids in preparing microservices for consumption. This is performed in certain example embodiments by creating an "API twin" for the microservice, enriching the service definition, applying API policies, packaging/deploying the API twin into a microgateway, and deploying this package as a sidecar.

Deploying the microgateway with the API twin (of the microservice) into the same container or pod where the microservice resides can help provide visibility and control over the inbound/outbound traffic of the microservice. This is technically advantageously in that it can, in turn, enable users to enforce more and different types of policies, including those that need more application context, while also improving observability of the microservices and microservice orchestration, for example.

FIG. 3 is a simplified block diagram of a service mesh environment 302 in accordance with certain example embodiments. The service mesh environment 302 in FIG. 3 includes a service mesh proxy 304, which communicates with a microservice (or microservices) 306. However, in accordance with certain example embodiments, there is an API twin 308 for the/each microservice 306. Node ports (not explicitly shown) and cluster ports 310a-310d receive external and internal traffic, as outlined above.

There are several potential challenges when it comes to microgateway deployment. First, it would be desirable to make the microgateway side car deployment automatic. This is accomplished in certain example embodiments by packaging the API twin in the microgateway, deploying the microgateway in the same pod where the microservice is running, and automatically "rewiring" the connections that already exist between the service mesh proxy 304 and the microservice 306 in such a way that microgateway resides between the service mesh proxy 304 and the microservice 306, without adversely impacting the service execution flow (e.g., the rewiring advantageously is transparent to the service execution flow). With this setup, the service mesh proxy 304 first receives the traffic inbound to the microservice 306, and enforces the configured rules. Then, the microgateway receives the traffic, enforces the policies, and forwards the request to the microservice 306. This is shown in FIG. 4, for example. For outbound traffic from the microservice 306, the microgateway receives the request, performs its enforcements, and then passes the traffic to the service mesh proxy 304, which then sends it to the destined target. This is shown in FIG. 5, for example.

Second, it would be desirable to ensure that the introduction of the microgateway is non-intrusive, and that there is no impact to the existing callers of the microservice. In this regard, callers can continue to invoke the service with the same URL(s) that they were using prior to the microgateway deployment. This means that even though the traffic is intercepted by the microgateway, there should not be any change in the URL that the clients use to invoke the microservice. This can be a technical challenge considering that the microgateway proxy will operate at the application layer, unlike service mesh proxies that operate at the network layer.

To help demonstrate these issues, consider an example "product-order" microservice that is deployed and managed using a service mesh. In this example, the product-order provides the following set of URLs, which are supported by the micro-service:

/product/{productID}
/product/{productID}/inventory
/order/{orderId}

FIG. 6 is a block diagram showing an example product-order microservice 602 prior to the injection of a microgateway with API twins. The product-order service 602 would be invoked by the callers using the above endpoints. For example, "GET /product/100" could be used to get the details of product with ID 100, "GET/order/10" could be used to get the details of order with ID 10, etc. Because the service mesh proxy 104 in FIG. 6 works at the network level, it does not necessarily care about the URLs being used to invoke the specific product-order microservice 602. It sniffs the traffic received at a certain port (e.g., port 9092 as shown the code snippet below) and enforces some rules before forwarding the request.

In case of a Kubernetes environment, for example, a microservice can be exposed for internal and external traffic as follows. First, a service definition is created. The service definition defines the "port" and the "target port" for the micro-service. Both the "port" and the "target port" are created in the pod, with the "port" defining where the traffic is received and with the "target port" defining the location to which it is to be forwarded. Thus, the microservice listens on the "target port." In typical definitions, the "port" and the "target port" are the same. Other information may be included with the definition such as, for example, protocol information, a name, etc. The following code snippet is an example port definition. In this example, line 3 specifies that port 9093 will receive the traffic, which will be forwarded to the target port 9092 as specified in line 4.t 1. -name: 5050http
2. port: 9093
3. protocol: TCP
4. targetPort: 9092

Second, a node port is defined. A Node port is used to expose a microservice to external clients. The following code snippet is an example node port definition. In this example, line 2 specifies that node port 30758 is opened for external clients outside the cluster. External traffic received over port 30758 will be forwarded to port 9093, which in turn forwards it to the microservice target port.

1. -name: 5050http
2. nodePort: 30758
3. port: 9093
4. protocol: TCP
5. targetPort: 9092

Now, assume that the service provider wants to enhance the user experience by introducing application-level enforcements through the use of an API twin, in accordance with certain example embodiments. Assume, for the purposes of explanation, that the provider decides to create two API twins instead on one for better manageability and to define "clean" interfaces, e.g., such that different related features share the same API twin but different notional operations are assigned to different API twins. FIG. 7 is a block diagram showing two API twins that could be injected into a microgateway to enhance the FIG. 6 example microservice, in accordance with certain example embodiments. FIG. 7 includes a Product API 702 and an Order API 704.

These twins can have different policy enforcements in certain example implementations. Each will route the request to the product-order service, however. The provider, after enhancing these API twins (Product API 702 and an Order API 704) with some policy enforcements, can then package them into a microgateway. The microgateway then can be deployed into the service mesh, similar to what is shown in the FIG. 3, in certain example embodiments.

After deployment of the microgateway, the provider typically would want requests (like the example "/product/100" request noted above) to pass through the microgateway before it is routed to the product-order service. To call the product API 702 or the Order API 704 in a microgateway the URLs generally would have the following format:

gateway/Product API/product/{productID}
gateway/Product API/product/{productID}/inventory
gateway/Order API/order/{orderId}

FIG. 8 shows the general structure of a URL for the FIG. 6 microservice, after microgateway injection, in accordance with certain example embodiments. As shown in FIG. 8, in a typical scenario, the microgateway will identify the API twin from the incoming URL using the part that contains the API twin name. The microgateway will now route the traffic to the microservice, after removing the context and the API twin name. This operation is apparent in FIG. 9, which is a block diagram showing the injected microgateway 902 with the FIG. 7 example API twins in the enhanced FIG. 6 microservice, in accordance with certain example embodiments. In the FIG. 9 example, the incoming traffic specifies the Product API 702 along with the product ID, which causes the microgateway 902 to separate out the latter and pass it to the product-order microservice 602 for further action.

Yet a challenge can arise because asking the existing callers of the product-order service to change the URL is not always desirable. In some instances it would not be feasible to do so, and in some instances it may be impossible. Thus, certain example embodiments enable non-intrusive microgateway deployment. This enables clients to continue invoking the same URLs (e.g., /product or/order URLs). However, in such instances, the microgateway intercepts these calls and maps them to the correct API twin (e.g., "/product" calls to Product API 702, "/order" calls to Order API 704), as the API twin name will not be a part of the incoming URL. The microgateway can enforce policies and then route the request to product-service, as appropriate. This can be technically challenging because the microgateway operates at the application level and context information that is presented in the URL (like "/gateway/Product API") is important to identify the right service(s) to invoke.

FIG. 10 is a block diagram showing the non-intrusive deployment of a microgateway 902', in accordance with certain example embodiments. The FIG. 10 example includes API context finding program logic 1002, which helps make the microgateway 902' intelligent so that the incoming microservice URL itself can be used to find the correct API context for execution of the policies and routing of the URL to the correct microservice 602. Example implementation details are provided below. These example implementation details further demonstrate the operation of the FIG. 10 example embodiment, including the API context finding program logic 1002.

Example Implementation

Details concerning an example implementation are provided below. It will be appreciated that this example implementation is provided to help demonstrate concepts of certain example embodiments, and aspects thereof are non-limiting in nature unless specifically claimed. For instance, certain example APIs, microservices, code snippets, algorithms, etc., are provided below to ease understanding of the example embodiments described herein and are not limiting unless explicitly claimed.

Example Techniques for Automatic Provisioning of the Microgateway in a Service Mesh Environment In a typical service mesh deployment, architectural components include a control plane and a data plane. The data plane helps manage the actual communication between the services. The service mesh proxies reside in the data plane, and they help govern and manage inbound/outbound traffic of the microservices. The control plane handles configuration, administrative, security, and monitoring related functions. The service mesh proxies in the data plane are configured from the components in the control plane in typical scenarios.

In certain example embodiments, in order to inject a microgateway with one or more API twins into the data plane, a controller may be provided in the control plane. The controller of certain example embodiments helps with several functions. First, it aids in visualizing the service mesh from the control plane. That is, it can help a developer "see" the microservice deployments that are present in the data plane, and how they are exposed (e.g., in terms of ports and endpoints) for internal and the external traffic. Second, the controller helps provide an understanding of the policies that are already enforced by the service mesh proxy. Third, the controller can help create one or more API twins for each microservice, and additionally or alternatively enrich API definitions. In this regard, the information provided from the service mesh about the microservice typically will be minimal. For example, details about the endpoint, service name, port details, etc., typically are provided. FIG. 11 is a screenshot showing minimal configuration information of the FIG. 6 example microservice from the service mesh.

It will be appreciated that the FIG. 11 screenshot omits information about what the microservice does, what interfaces it offers, etc. This information nonetheless may be important, needed, or desirable, when enabling the overall service to consume the microservice and in allowing for the definition of application-level enforcements. Creating an API twin via the controller of certain example embodiments enables a developer to enrich the service by adding details about the service specification. The service specification details obtained from microservice developer are added to the API twin in the API gateway, together with added policy enforcements with context (such as, for example, data masking or request/response transformation, etc.) and the routing policy that will be configured to route the traffic from an API twin in microgateway to microservice.

The code snippet shows a sample policy definition that is a collection of many policy actions. The policy is pulled by the microgateway. In this example, the JSON format is used; however, it will be appreciated that other structured formats (such as XML) or unstructured formats may be used in different example embodiments.

```
1. {
2. "id": "c5eb5ad3-7776-4f26-89db-8fa3e702fd60",
3. "names": [{
4. "value": "Default Policy for API product-service",
5.}],
6.
7. "policyEnforcements": [{
8. "enforcements": [{
9. "enforcementObjectId": "a114c9ba-3d41-46f1-8e70-02469f730bbb",
10. "order": "0"
11.}],
12. "stageKey": "routing"
13.},
14. "enforcements": [{
15. "enforcementObjectId": "69661747-0806-46c3-aef4-e3afa34fe5ea",
16. "order": "0"
17.}],
18. "stageKey": "IAM"
19.},
20. "enforcements": [{
21. "enforcementObjectId": "64a1f2b6-a533-4def-8e22-61e50bb7cd42",
22. "order": "0"
23.},
24. "enforcementObjectId": "169907a3-3bd3-46c7-bce1-93d32c96a363",
25. "order": "1"
26.}],
27. "stageKey": "servicemeshingress"
28.}, {
29. "enforcements": [{
30. "enforcementObjectId": "dc95c01a-a9a6-414d-8a54-5fdb3bef06c9",
31. "order": "0"
32.}],
33. "stageKey": "transport"
34.},
35. "enforcements": [{
36. "enforcementObjectId": "d55ff3dc-4e8a-4ca1-82a9-2912f3e87eed",
37. "order": "0"
38.}],
39. "stageKey": "responseProcessing"
40.}],
41.}
```

Lines 7-18 and 34-40 of the above code snippet detail three example policy actions, namely, the identify and authorize action, the routing policy action, and the response processing policy action.

The following code snippet is a sample policy definition related to the identify and authorize action. The identify and authorize action provides identity and security to the microservice via an API key, as noted in line 21 of the code snippet immediately below.

```
1. {
2. "id": "69661747-0806-46c3-aef4-e3afa34fe5ea",
3. "names": [{
4. "value": "Identify & Authorize Application",
5. "locale": "en"
6.}],
7. "templateKey": "evaluatePolicy",
8. "parameters": [{
9. "templateKey": "logicalConnector",
10. "values": ["OR"
11.}, {
12. "templateKey": "allowAnonymous",
13. "values": ["false"]
14.}, {
15. "templateKey": "IdentificationRule",
16. "parameters": [{
17. "templateKey": "applicationLookup",
18. "values": ["open"]
19.}, {
20. "templateKey": "identificationType",
21. "values": ["apiKey"]
22.}]
23.}],
24. "active": false
25.}
```

The following code snippet relates to the routing policy action. The routing policy action routes the incoming traffic to the microgateway on to the microservice. Line 10 shows the microservice URI to which the microgateway will route.

```
1. {
2. "id": "a114c9ba-3d41-46f1-8e70-02469f730bbb",
3. "names": [{
4. "value": "Straight Through Routing",
5. "locale": "en"
6.}],
7. "templateKey": "straightThroughRouting",
8. "parameters": [{
9. "templateKey": "endpointUri",
10. "values": ["http://localhost:9092/${sys:resource_path}"]
11.}, {
12. "templateKey": "method",
13. "values": ["CUSTOM"]
14.}],
```

15. "active": false
16.}

The following code snippet relates to the response processing policy action. The response processing policy action performs context-based filtering of the microservice response, and in this example converts the "currency" in the response payload from INR to USD for all American Apps identified with the API key. That is lines 10, 17, and 23 show the JSON Path of the response for the change.

1. {
2. "id": "d55ff3dc-4e8a-4ca1-82a9-2912f3e87eed",
3. "names": [{
4. "value": "Data Masking",
5. "locale": "en"
6.}],
7. "templateKey": "responseDataMasking",
8. "parameters": [{
9. "templateKey": "consumerIdsOptional",
10. "values": ["AmericanApp"]
11.},
12. "templateKey": "jpathMasking",
13. "parameters": [{
14. "templateKey": "maskingCriteria",
15. "parameters": [{
16. "templateKey": "action",
17. "values": ["$.currency"]
18.},
19. "templateKey": "maskingType",
20. "values": ["mask"]
21.},
22. "templateKey": "maskValue",
23. "values": ["USD"]
24.}]
25.}]
26.},
27. "templateKey": "sameForTransactionalLogging",
28. "values": ["true"]
29.},
30. "templateKey": "applyForPayload",
31. "values": ["true"]
32.}],
33. "active": false
34.}

Certain example embodiments involve the deployment of microgateways along with API twins and policy enforcements into the data plane, along with microservices as sidecars. Certain example embodiments further automatically reroute traffic to the microservices by changing the port definitions in the service mesh environments so that the traffic can flow into the microgateways before reaching the microservices. FIG. 12 is a block diagram showing the automatic injection of API twin inclusive microgateways into service meshes, in accordance with certain example embodiments. FIG. 12 shows the control plane 1202 and the data plane 1204. The control plane includes the controller engine 1206. The controller engine 1206 may be implemented using the webMethods API gateway or other technology in different example embodiments. As described above, the controller engine 1206 can be used for visualization, API twin deployment, etc.

The data plane includes a plurality of pods 1208a-1208c. The pods 1208a-1208c respectively include service mesh proxies 1210a-1210c, API twin inclusive microgateways 1212a-1212c, and microservices 1214a-1214c. Although only three pods are shown in the FIG. 12 example, it will be appreciated that more or fewer pods may be deployed in different example instances. Moreover, in different example implementations, each pod may include one or more API twins and one or more microservices. The API twins and microservices in a given pod may be provided in one-to-one, many-to-one, or many-to-many arrangements in different example embodiments.

A Kubernetes deployment may be used for the service mesh in certain example embodiments. In certain example embodiments, including when Kubernetes is used (for example), deployment descriptors contain the microservice information and how it is exposed to the external and internal traffic. The following two code snippets are sample descriptors for Kubernetes. Each describes the deployment of a microservice named "product-order" and a service that has the port information to expose the microservice for consumer consumption. The code snippet immediately below explains the deployment in the absence of a microgateway, e.g., as shown in FIG. 6. Here, the service mesh proxy definition is implicit.

1. ###############################################################
2. #Product Order services Deployment descriptor
3. ###############################################################
4. apiVersion: v1
5. kind: Service
6. metadata:
7. name: product-service
8. labels:
9. app: product-service
10. spec:
11. ports:
12. -name: 5050http
13. nodePort: 30758
14. port: 9092
15. protocol: TCP
16. targetPort: 9092
17. type: NodePort
18. selector:
19. app: product-service
20. ---
21. apiVersion: apps/v1
22. kind: Deployment
23. metadata:
24. name: product-service
25. labels:
26. app: product-service
27. version: v1
28. spec:
29. replicas: 1
30. selector:
31. matchLabels:
32. app: product-service
33. template:
34. metadata:
35. labels:
36. app: product-service
37. version: v1
38. spec:
39. containers:
40. -name: product-service-image
41. image: product-service
42. imagePullPolicy: Always
43. ports:
44. -containerPort: 9092
45. ---

Lines 41-44 detail the product-service microservice that is exposed on port 9092 inside of the pod. Lines 13-16 detail how this product-service microservice is opened for external traffic on port 30758, and maps it to port 9092 of the microservice that is created inside the pod.

The Kubernetes service and the deployment are matched using the label selectors. In line 9 above, the service is labeled with a label "app: product-service". Line 32 indicates that this deployment is described with the "app: product-service" selector.

In certain example embodiments, the API gateway connects to the service mesh environment and modifies the deployment of the pod as shown in the code snippet below. Alternatively, in certain example embodiments, the following code snippet may be generated more directly. The modified code snippet below represents a deployment descriptor with the microgateway injected therein.

1. ################################################
############
2. #Product order services deployment descriptor, incl API Gateway.
3. ################################################
############
4. apiVersion: v1
5. kind: Service
6. metadata:
7. name: product-service
8. labels:
9. app: product-service
10. spec:
11. ports:
12. -name: 5050http
13. nodePort: 30758
14. port: 9092
15. protocol: TCP
16. targetPort: 7071
17. type: NodePort
18. selector:
19. app: product-service
20. ---
21. apiVersion: apps/v1
22. kind: Deployment
23. metadata:
24. name: product-service
25. labels:
26. app: product-service
27. version: v1
28. spec:
29. replicas: 1
30. selector:
31. matchLabels:
32. app: product-service
33. template:
34. metadata:
35. labels:
36. app: product-service
37. version: v1
38. spec:
39. containers:
40. -name: product-service-image
41. image: product-service
42. imagePullPolicy: Always
43. ports:
44. -containerPort: 9092
45. -name: microgateway
46. image: microgateway
47. imagePullPolicy: Always
48. ports:
49. -containerPort: 7071
50. protocol: TCP
51. -env:
52. -name: mcgw_downloads_apis
53. value: product-order
54. -name: mcgw_api_gateway_url
55. value: http://myapigateway.domain Line 45-55 detail the microgateway (with the API twin) being injected into the already existing deployment of the product-order deployment. Line 49 indicates that this microgateway is opened on port 7071. Line 16 indicates that the target port that was pointing to port 9092 in the sample before injection is now changed to port 7071 such that the external traffic now will be routed to the microgateway. The routing policy that is configured in the API twin will redirect the traffic from the microgateway to the microservice running on port 9092.

Figure 13:
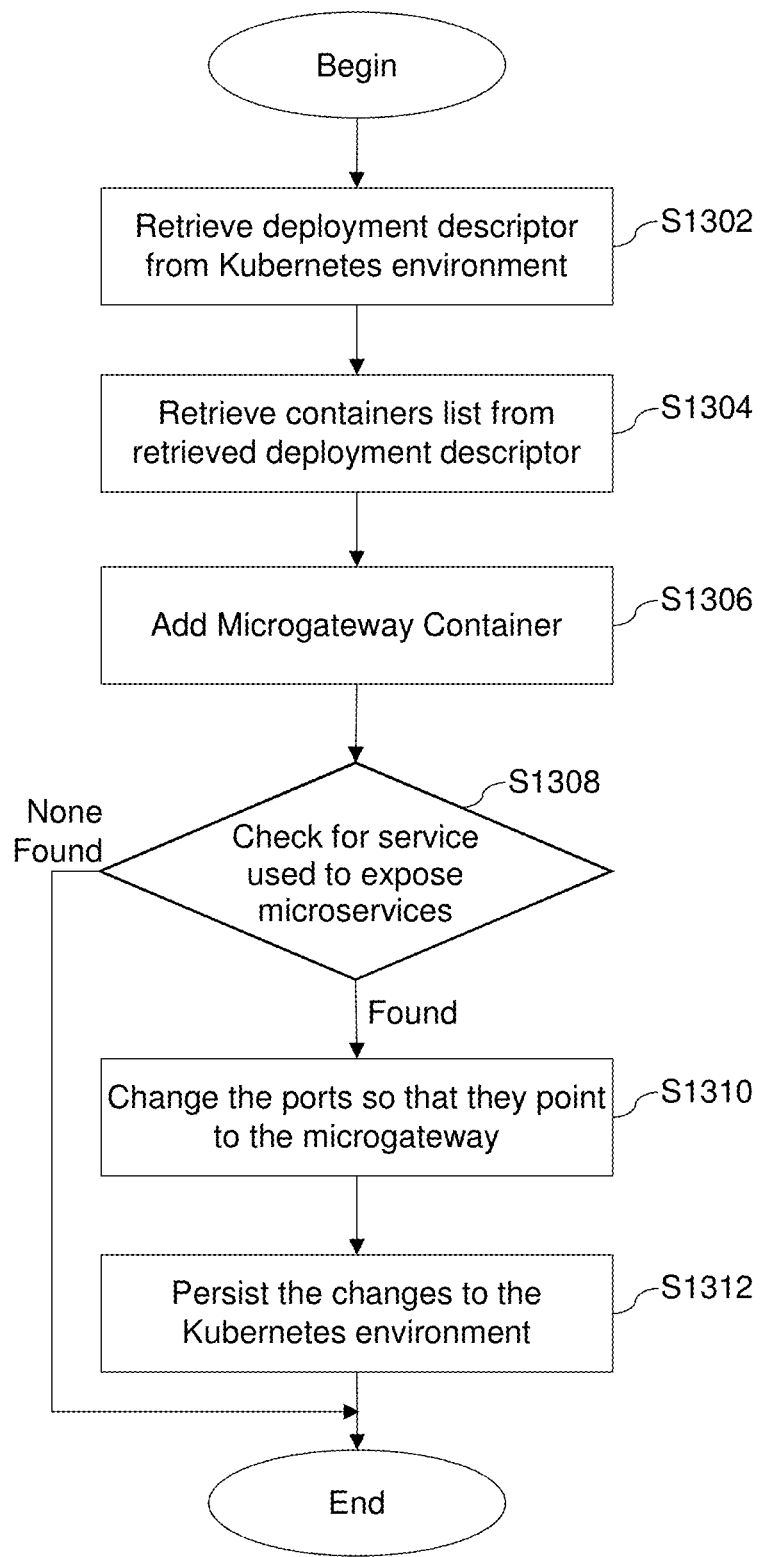
FIG. 13 is a flowchart shown how the automatic injection of a microgateway can be accomplished, in accordance with certain example embodiments.

FIG. 13 is a flowchart shown how the automatic injection of a microgateway can be accomplished, in accordance with certain example embodiments. As shown in FIG. 13, in step S1302, the deployment descriptor is retrieved from the operative environment. The environment may be a Kubernetes environment, in certain example implementations. The containers list is retrieved from the deployment descriptor in step S1304. The microgateway container is added in step S1306. A check is performed to identify the service that is used to expose the microservices in step S1308. If there are no services or no exposed microservices as determined in step S1308, then the process is ended. On the other hand, if there is a service and/or one or more exposed microservices, the ports in the deployment descriptor are changed in step S1310. Inbound traffic is first routed to the microgateway and the ultimate end target by way of the API twin is the microservice. The changes are persisted to the environment in step S1312, and the process is ended.

The code snippet below is pseudo-code that may be executed at the API gateway creating the modified deployment descriptor to inject the microgateway sidecar into the existing deployment descriptor. This code is executed after the deployment action is performed in the API gateway. The deployment action is performed when the user wants to package the API twin configurations in the microgateway and then deploy the microgateway into the service mesh. It may be used to implement at least a part of the example process shown in FIG. 13.

1. automatic_sidecar_injection(deployment,namespace)
2. let sidecar_microgateway
3. containers[ ] allcontainers=deployment.containers
4. length=allcontainers. Length
5. allcontainers[length++]=sidcar_microgateway
6. matching_labels=deployment.labels
7. services[ ] allservices=get_services(deployment, namespace)
8. for service in service_match_deployment
9. service.targetPort:=micorgateway_port.
10. for service in allservices
11. if(service.matchLables.contains(matching_labels))
12. return_services.add(service)
13.
14. get_services(deployment,namespace)
15. services[ ] matching_services
16. matching_labels=deployment.labels
17. services[ ] allservices=get_all_services(namespace)
18. for service in service_match_deployment
19. targetPort:=micorgateway_port.
20. for service in allservices 21. if(service.matchLables.contains(matching_labels))
22. return_services.add(service)
23. return matching_services Lines 2-5 inject the microgateway container to the list of containers that are present in the deployment. See step S1306 in FIG. 13. Line 7 calls another method to retrieve the matching Kubernetes services that are present in the deployment. See step S1308. This may be performed with the help of the labels that are present in the deployments. Line 14 details the method that would retrieve matching_services for deployment from the matching labels. Line 9 changes the target port of the service to the port on which the microgateway is exposed. See step S1310. This is what aids the rerouting of traffic to the microgateway from the service mesh proxy. The API twin with the enriched API definitions and policy enforcements is created in the API Gateway. During the deployment action, the API gateway packages the configuration details about the API twin in the microgateway.

Figure 14:
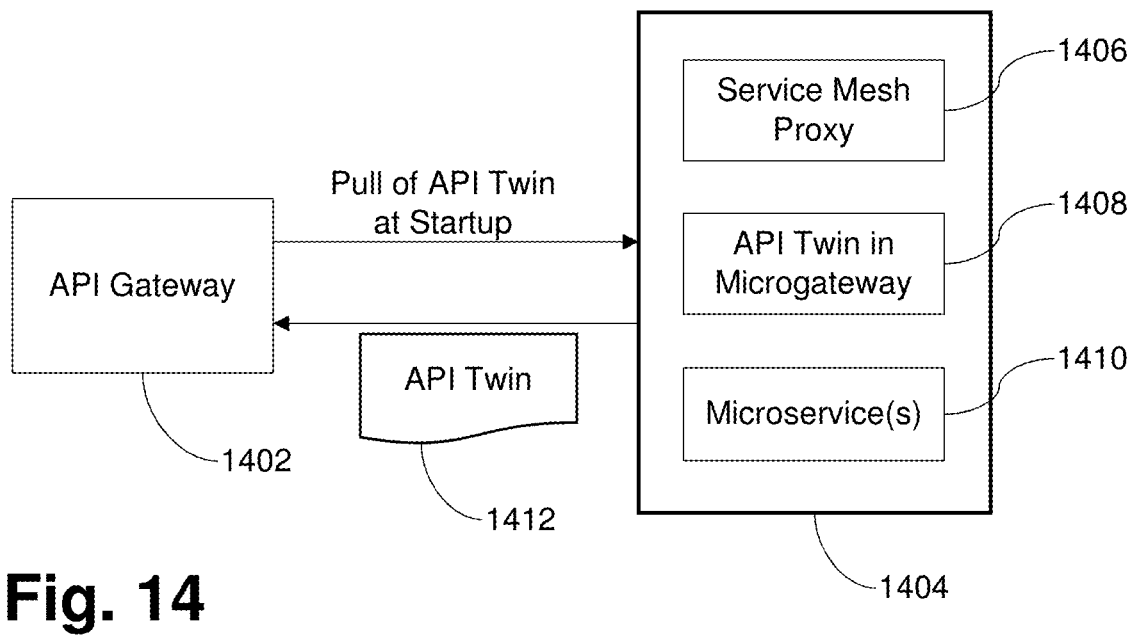
FIG. 14 shows the interaction of the API gateway with a pod during startup, in accordance with certain example embodiments.

When Kubernetes starts the containers, the microgateway starts, and it will pull the API twin details from the API gateway. In this regard, FIG. 14 shows the interaction of the API gateway 1402 with the pod 1404 during startup, in accordance with certain example embodiments. The pod 1404 includes the service mesh proxy 1406, API twin inclusive microgateway 1408, and microservice 1410. The controller 1402 (here implemented as webMethods API Gateway) pulls the API twin 1412 along with the policy definitions during startup.

Figure 15:
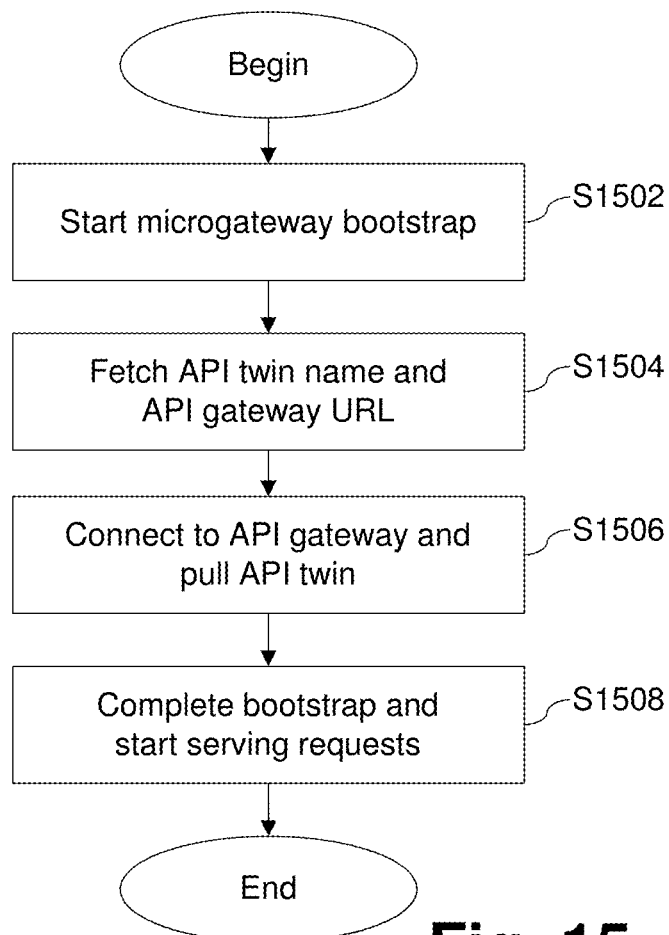
FIG. 15 is flowchart showing bootstrapping of the microgateway at service mesh deployment time, when the containers are created, in accordance with certain example embodiments.

The following pseudo-code may be used for microgateway deployment. Lines 8-10 set the environment variables that are a part of the injected microgateway-sidecar deployment containing information about the API twin and the API gateway URL to be communicated.
1. name: microgateway-sidecar
2. image: microgateway-sidecar
3. imagePullPolicy: Always
4. ports:
5. -containerPort: 7071
6. protocol: TCP
7. -env:
8. -name: api_twin_name
9. value: product-service
10. -name: api_gateway_url
11. value: http://myapigateway.domain FIG. 15 is a flowchart showing bootstrapping of the microgateway at service mesh deployment time, when the containers are created, in accordance with certain example embodiments. As shown in FIG. 15, microgateway bootstrap is started in step S1502. The API twin name and API gateway URL are retrieved from the environment variables in step S1504. In step S1506, a connection to the API gateway is formed and the API twin is pulled. The bootstrap is completed and requests start being served in step S1508.

Example Techniques for Non-Intrusive URL Mapping

As explained above, it can be technically challenging to ensure that the URLs that were previously used to access the microservice remain accessible but are made to pass through the microgateway. The microgateway has the information about the microservice and the API twin that was provisioned to it, as per the above. The example "product-order" microservice as described above has URLs including/product/{productID}, /product/{productID}/inventory, and/order/{orderId}, and the API twin contains two APIs (namely, the Product API and the Order API) that have their own set of policy enforcements and routing logic to the microservice. See FIG. 7 for a visual representation.

When an input request (e.g., /product/{productID}) is received at the microgateway, the API twin for the request is found. The API twin executes the policies that are attached to the API and then can route to the microservice.

To find the API twin for the incoming URL, the microgateway may maintain a map of the allowed URLs and their respective API contexts. For instance, in this example, the twin should be the Product API when the input URL is /product/{productId} or /product/{productId}/inventory, and the twin should be the Order API and when the input URL is /order/{orderId}. In certain example embodiments, the path parameter nodes will not have a static value and their values instead will be dynamic (e.g., {productid}); thus, it would be desirable to provide an intelligent map that can find the API context for the input URL.

Figure 16:
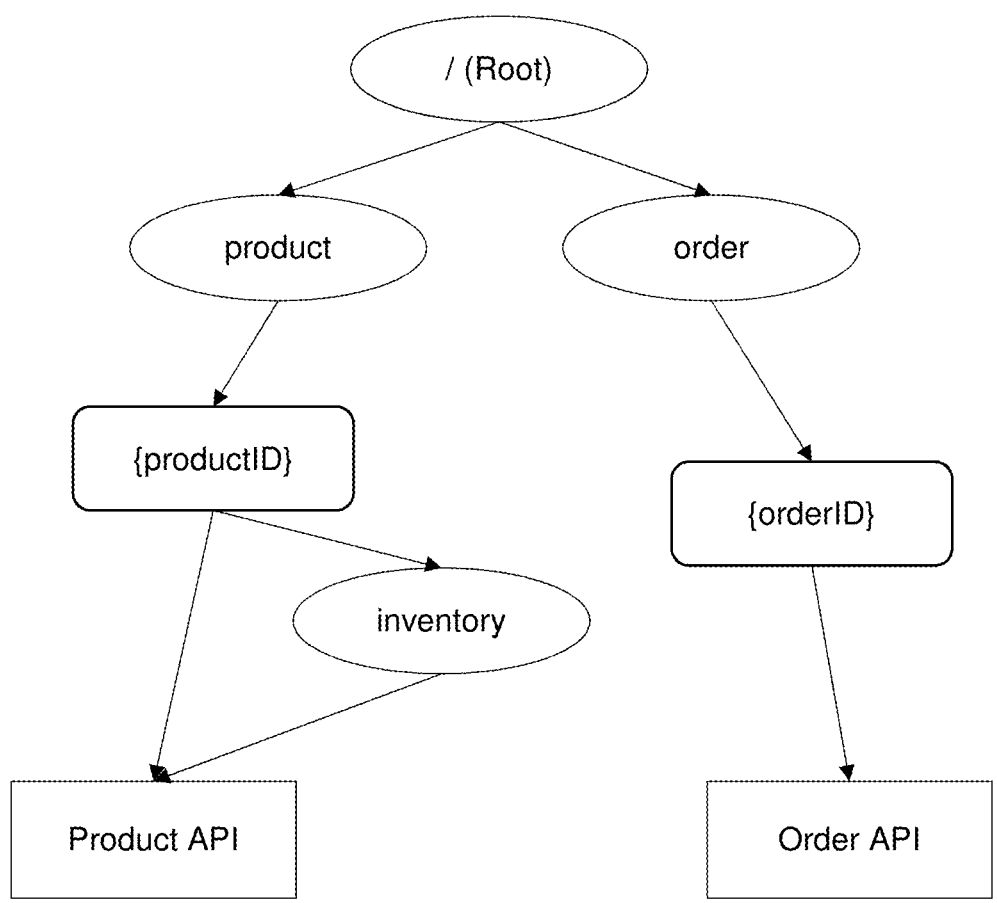
FIG. 16 is an example trie structure for the product and order example APIs discussed herein.

The map may be maintained as a trie data structure (also sometimes called a digital tree, prefix tree, or search tree) or other data structure that can assist with URL and path mapping. A trie is a data structure that is used for efficient information retrieval and therefore may be convenient for certain example embodiments. A trie may be constructed based on the URLs the microservice will expose, with the API context as the leaf nodes. FIG. 16 is an example trie structure for the product and order example APIs discussed herein.

With a trie structure, insert and search operations can be made optimal in $O(m)$ time, where m is the length of the URL to be searched. In other forms of data structures like binary trees, the search takes $m*\log N$ time where N is the number of keys. In any event, the trie or other data structure is parsed when a request is received at the microgateway. The parsing helps map the request to the API that will then route the request to the microservice.

Figure 17:
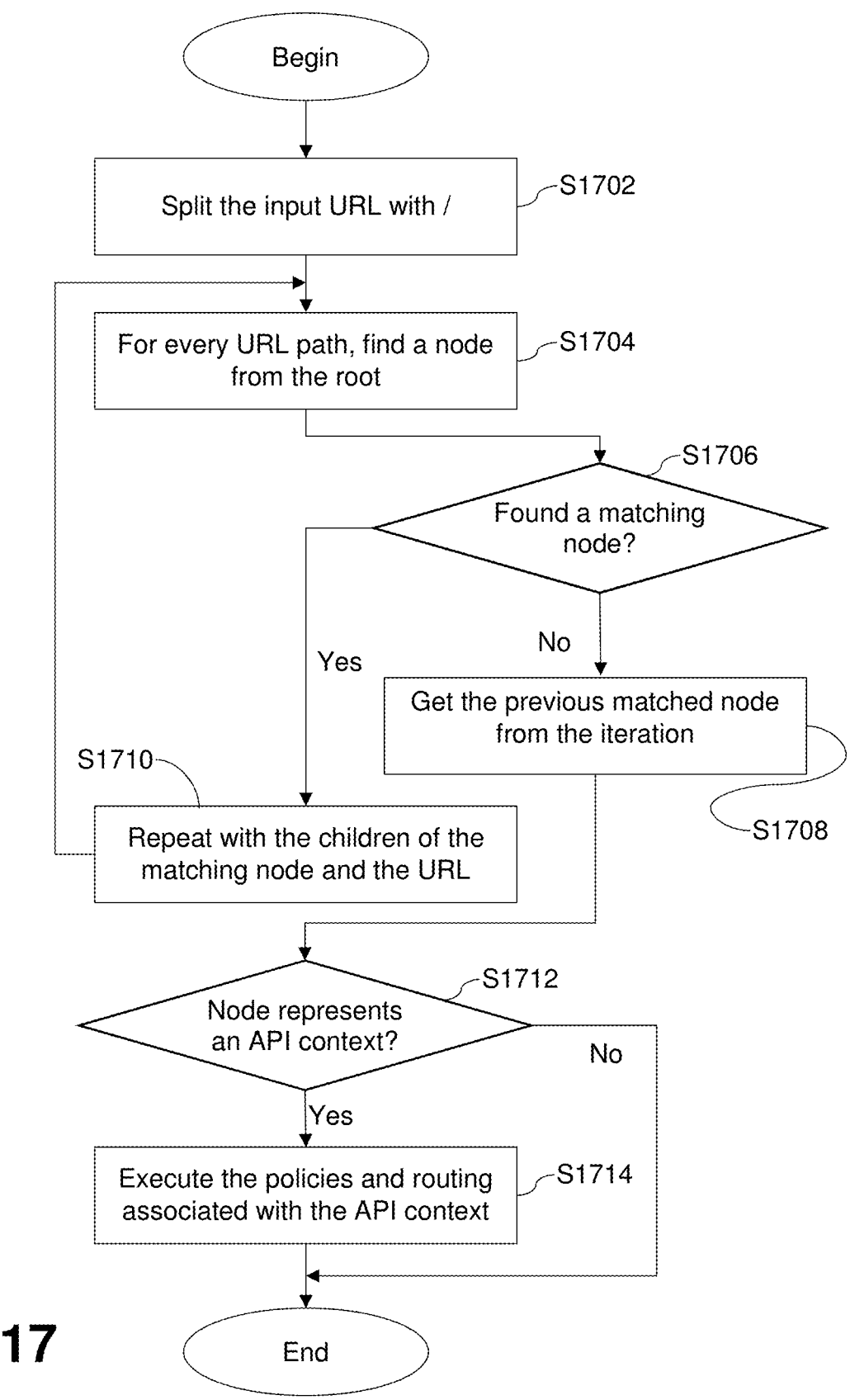
FIG. 17 is a flowchart showing an example process for performing non-intrusive URL mapping in accordance with certain example embodiments.

FIG. 17 is a flowchart showing an example process for performing non-intrusive URL mapping in accordance with certain example embodiments. As shown in FIG. 17, the URL is parsed in step S1702, e.g., with each "/" symbol. As indicated in step S1704, for each URL path, a node from the route is found. Step S1706 looks for a matching node. If there is a matching node found in step S1706, then a recursive loop is triggered as indicated in step S1710, such that the process is repeated with the children of the matching node and the URL. The process returns to step S1704 for this purpose. On the other hand, if a matching node is not found in step S1706, the previous matched node from the iteration is retrieved in step S1708. A determination is made in step S1712 as to whether the node represents an API context. If the matching node does not represent an API context as determined in step S1712, then the process is ended. However, if the matching node does represent an API context as determined in step S1712, then the policies and routing associated with the API context are executed in step S1714.

The following code snippet may be used as an algorithm for non-intrusive lookup. As will be appreciated from the above, the input to the search algorithm is the URL incoming to the microgateway. The URL parts are parsed against the trie data structure as explained in connection with FIG. 17, and the matching API is returned.
1. search (input_url): API
2. string[ ] url_parts=split(input_url, "/")
3. Node root_node=ROOT_TRIE_NODE
4. return traverse(root_node.children,url_parts)
5.
6.
7. traverse (List<Node> nodes,String[ ] url_parts): Node
8. string start=url_parts[0]
9. for node in nodes 10. url_parts.remove(o)
11. if(node.type='Path parameter')
12. return traverse (node.children,url_parts)
13. if(node.type='API')
14. return node
15. if node.value==start
16. return traverse (node.children,url_parts)

In the algorithm, lines 2-4 set up the search algorithm that will find an API context. Line 7 stats the definition of how the trie is to be traversed. In general terms, the traversal involve recursive searching until a match for the API context is found.

Brand Factory Example

Figure 18:
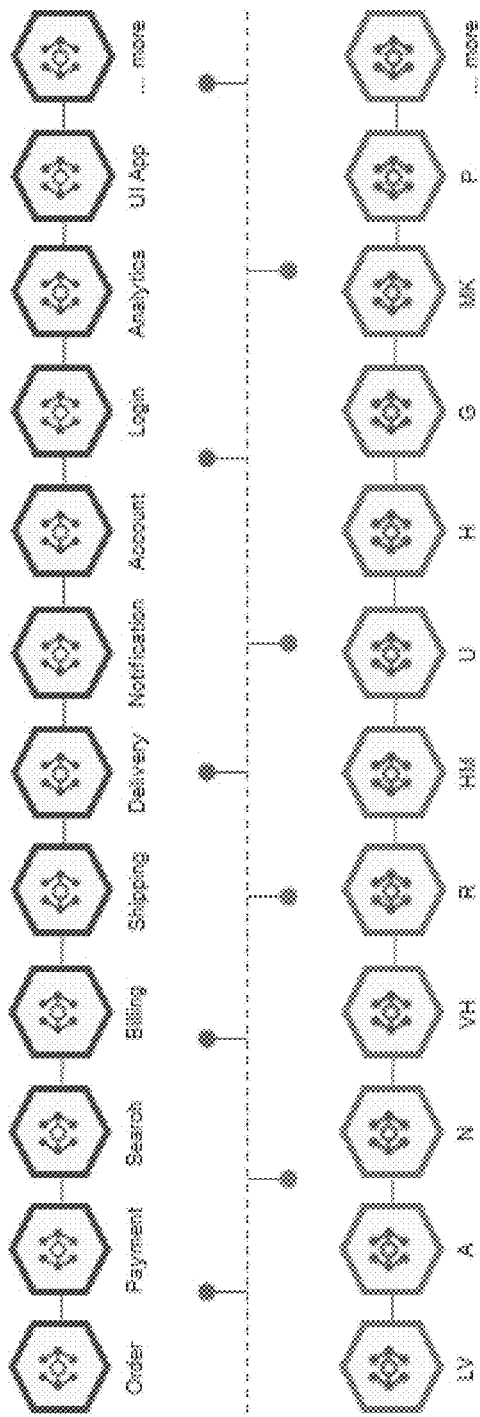
FIG. 18 shows examples services and brands for the example Brand Factory.

This example helps demonstrate concepts described above. In this example, Brand Factory is an ecommerce portal that sells multiple brand clothing and apparel, worldwide, for all age groups. In this example, Brand Factory has adopted a microservices architecture and has created hundreds of services currently deployed in K8S and managed through an ISTIO Service Mesh. FIG. 18 shows examples services and brands for the example Brand Factory.

Figure 19:
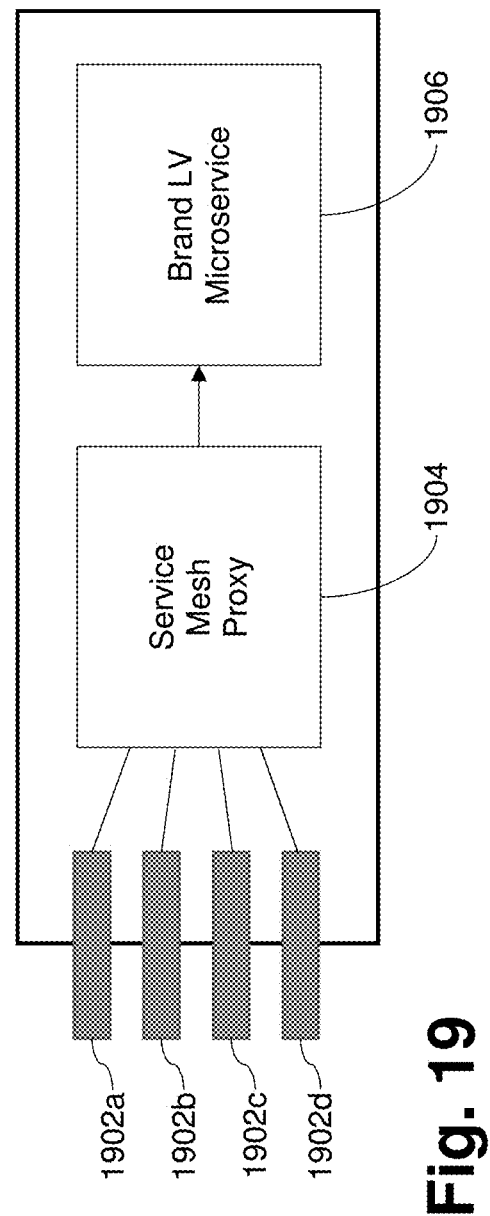
FIG. 19 is a block diagram for the example Brand LV microservice, similar to FIG. 2.

There are application microservices such as search, notification, account, analytics, etc., and there are brand specific microservices such as Brand A, Brand LV, etc. FIG. 19 is a block diagram for the example Brand LV microservice and is similar to FIG. 2, in that there are ports 1902a-1902d, a service mesh proxy 1904, and the Brand LV microservice 1906. The following code snippet may be used in connection with an API call to the Brand LV microservice:

1. {
2. "_id": "100",
3. "name": "LV",
4. "description":: null,
5. "price": 0,
6. "currency": "INR",
7. "image": "./img/lv.png",
8. "url": null
9.}

This API call may be a part of a GET, e.g., at a location with a port specified as 30758 and with the relative path of "products/100".

These microservices work together to provide a seamless user experience for the users using a web user interface portal or the like. Because these services are already managed through the ISTIO service mesh, there is already a service mesh proxy that does the required "heavy lifting" to facilitate inter-service communications.

When the service provider wants to make an application-level enforcement using a conventional approach, the service provider would have to change the microservices implementation. For example, if the service provider would like to provide a customized experience for the users of the web portal (like providing the ability to filter clothing and apparel from a brand depending on the age, gender, and the location of the logged in user, or automatically changing the currency based on the geo-location of the user, etc.), doing so would involve changes to the microservices implementation. The implementation changes would involve extracting the logged-in user data from the authentication tokens and using this data for filtering to obtain the customized result. A conventional service mesh proxy cannot help here, unfortunately, as it does not have much information about the user and cannot readily obtain it from the little information passed to it by the service mesh proxy. The service mesh proxy does not have much information about "what" the service exposes In the above example, assume that the Brand LV microservice will return the list of products (like clothing, apparel, handbags, etc.) that Brand LV wants to make available via the Brand Factory portal. For instance, assume that the call http://host:9092/product-service/products/is intended to return all products. This microservice is wired into the larger Brand Factory microservices setup so that other components like the UI, order, search, and other services can talk to the Brand LV. Thus, when a user logs into the UI, the user could see all of the products offered by the Brand Factory.

Assume further that the service provider wants to enhance the Brand Factory portal to provide a better user experience. When the user logs into the UI, then the user should see only the products that are available at the user's location, tailored to his/her age and gender, etc. Context-based filtering may be performed to create a customized response that would convert the currency (e.g., INR to USD) according to the user's geolocation. In a typical scenario, in order to support this, the microservice developer would change the microservice. Moreover, this cannot be accomplished using service mesh because the service mesh lacks information about what the Brand LV microservice does.

Figure 20:
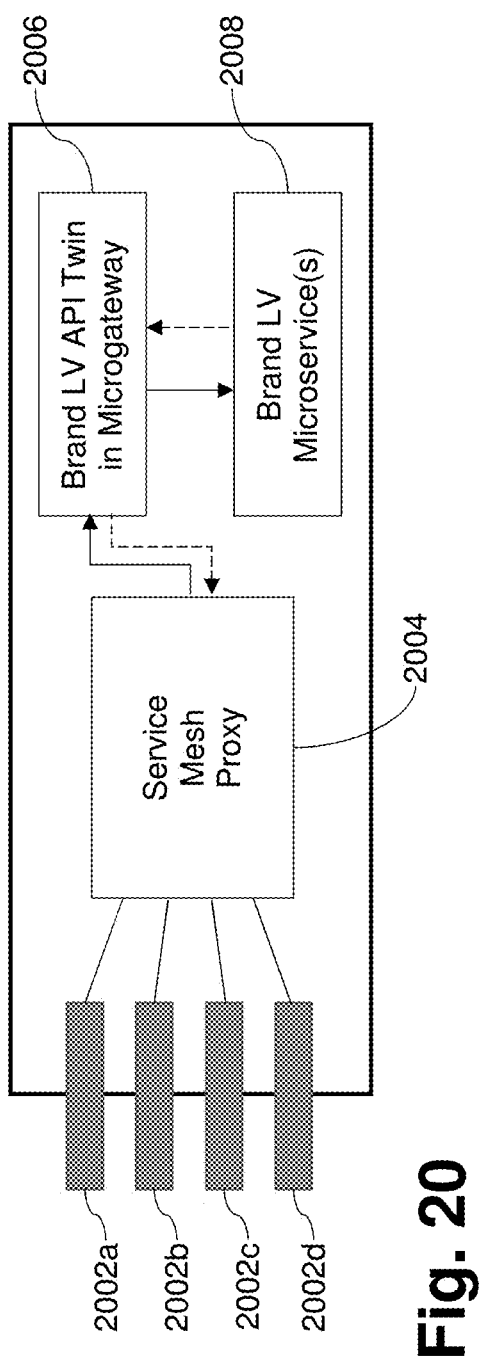
FIG. 20 is a block diagram for the example Brand LV microservice that uses a microgateway in accordance with certain example embodiments.

As will be appreciated from the above, a microgateway with an API twin can help reduce or eliminate the need for the service provider to make changes to the service implementation. FIG. 20 is a block diagram for the example Brand LV microservice that uses a microgateway in accordance with certain example embodiments. FIG. 20 is similar to FIG. 3, and FIG. 20 builds on FIG. 19 similar to how FIG. 3 builds on FIG. 2. FIG. 20 includes ports 2002a-2002d, together with a service mesh proxy 2004 that communicates with the Brand LV API twin inclusive microgateway 2006. The microgateway 2006 communicates with the Brand LV microservice 2008.

In FIG. 20, the microgateway 2006 can intercept the traffic that is bound to the Brand LV microservice 2008, read the authentication token, extract user data, and send a customized query to the Brand LV microservice 2008 with the required filters applied. Similarly, in the response flow (shown in dashed lines), the Brand LV microgateway 2006 can change the response sent by the Brand LV microservice 2008 to the clients. For example, the response sent by the Brand LV microservice 2008 normally might have the currency units in 'INR' but the service provider might like to convert this to USD for American customers.

Figure 21:
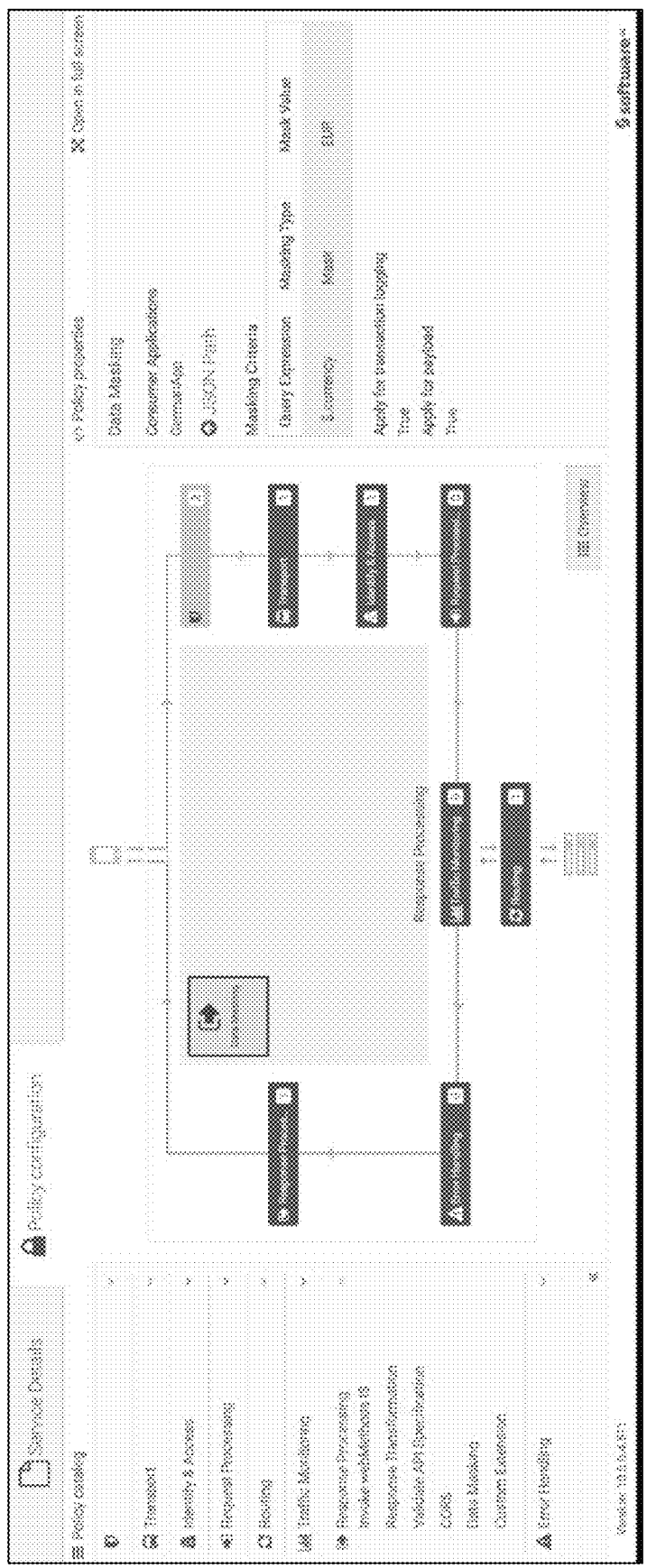
FIG. 21 shows the execution flow and filtering policy action for the Brand LV microservice and hypothetical discussed herein, in accordance with certain example embodiments.

FIG. 21 shows the execution flow and filtering policy action for the Brand LV microservice and hypothetical discussed herein, in accordance with certain example embodiments. The figure shows the policy definition screen of webMethods API Gateway. As above, policies may be thought of as being a set of rules/actions that are enforced/performed in a service's request/response flow. Typical service mesh policies are mutual TLS, routing, circuit breaker, etc. In certain example embodiments, the policies added in this screen are enforced by the microgateway on the API twin. Policies enforced by microgateway can be mutual TLS, API key, JWT claim based authentication, request/response payload transformation, data masking, content/context based routing, etc. Thus, it will be appreciated that certain example embodiments may involve the microgateway enforcing policies at a generally higher level (and there is the possibility for overlaps, such as mutual TLS, for example). In this example, the user adds the data masking policy, which will mask the value of element "currency" with the text "USD" for the requests originating from "AmericanApp".

With the microgateway injected in the flow, the response is changed in that the currency is now USD rather than INR. The following code snippet shows the changed response, which can be compared with the preceding code snippet. Note the difference in line 6 of each code snippet.

1. {
2. "_id": "100",
3. "name": "LV",
4. "description":: null,
5. "price": 0,
6. "currency": "USD",
7. "image": "./img/lv.png",
8. "url": null
9.}

Figure 22:
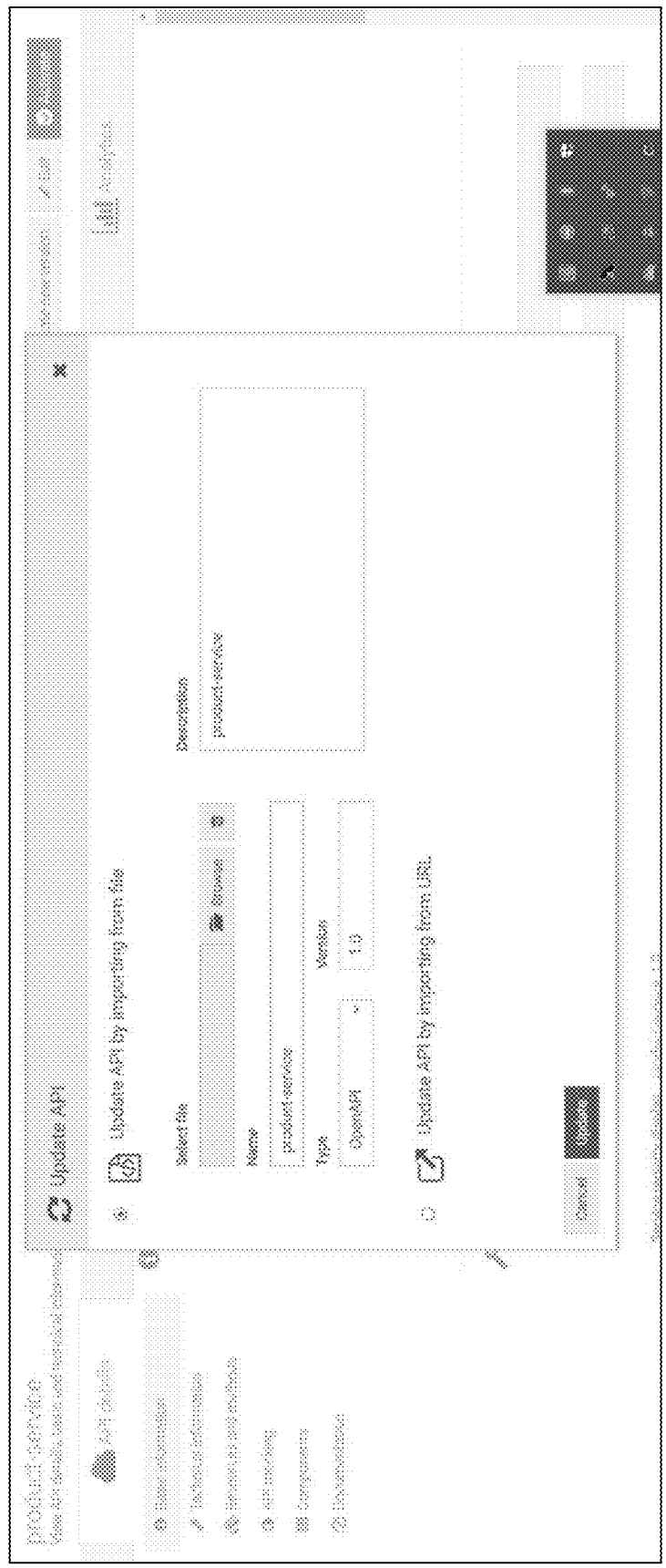
FIG. 22 is an example screenshot that may be used in updating a microservice in accordance with certain example embodiments.

This functionality may be realized by following the following example procedure, e.g., with the first seven operations occurring in the API gateway. First, the provider connects to the service mesh from the API gateway. Second, the list of microservices is provided for the developer to view, e.g., in a GUI visualization or the like. Third, the Brand LV microservice is selected. Fourth, in the API gateway, the API twin for the Brand LV microservice is created or updated. The API twin is enhanced with an API interface by adding OpenAPI or other service specifications. The OpenAPI or other specification may provide details about the interfaces exposed by the microservice and its available endpoints (in this case, for example, /products) and operations on each endpoint (in this case, for example, GET/products, POST/products). In this regard, FIG. 22 is an example screenshot that may be used in updating a microservice in accordance with certain example embodiments.

FIGS. 23A-23B provide a code snippet of an OpenAPI specification of the Brand LV example microservice, which may be used in certain example embodiments. Lines 11 and 31 define the resources for the Brand LV microservice. The API gateway and the microgateway, as well as the microservices themselves, may be hosted on computing systems. These computing systems may include processing resources such as at least one processor and a memory coupled thereto. The memory may store instructions that, when executed by the processing resources, provide functionality of the API gateway, microgateway, microservices, etc. The API twins may operate by placing API calls, web service calls, and/or the like, over communication channels using a protocol such as, for example, HTTP, SOAP, JMS, and/or the like, etc. Further processing of the API twins may be enabled by virtue of their being hosted on the computing system(s) and/or via the processing resources. It will be appreciated that the same or different computing systems may be used for the API gateway, microgateway, and each of the microservices. Those skilled in the art will appreciate that these and/or other similar hardware configurations may be used to support container environments. Further, as will be appreciated from the description, in certain example embodiments, the microgateway may be configured as a container hosting one of more API twins, and the "microgateway container" may itself be hosted within a "larger" container pod controlled by the API gateway.

Figure 24:
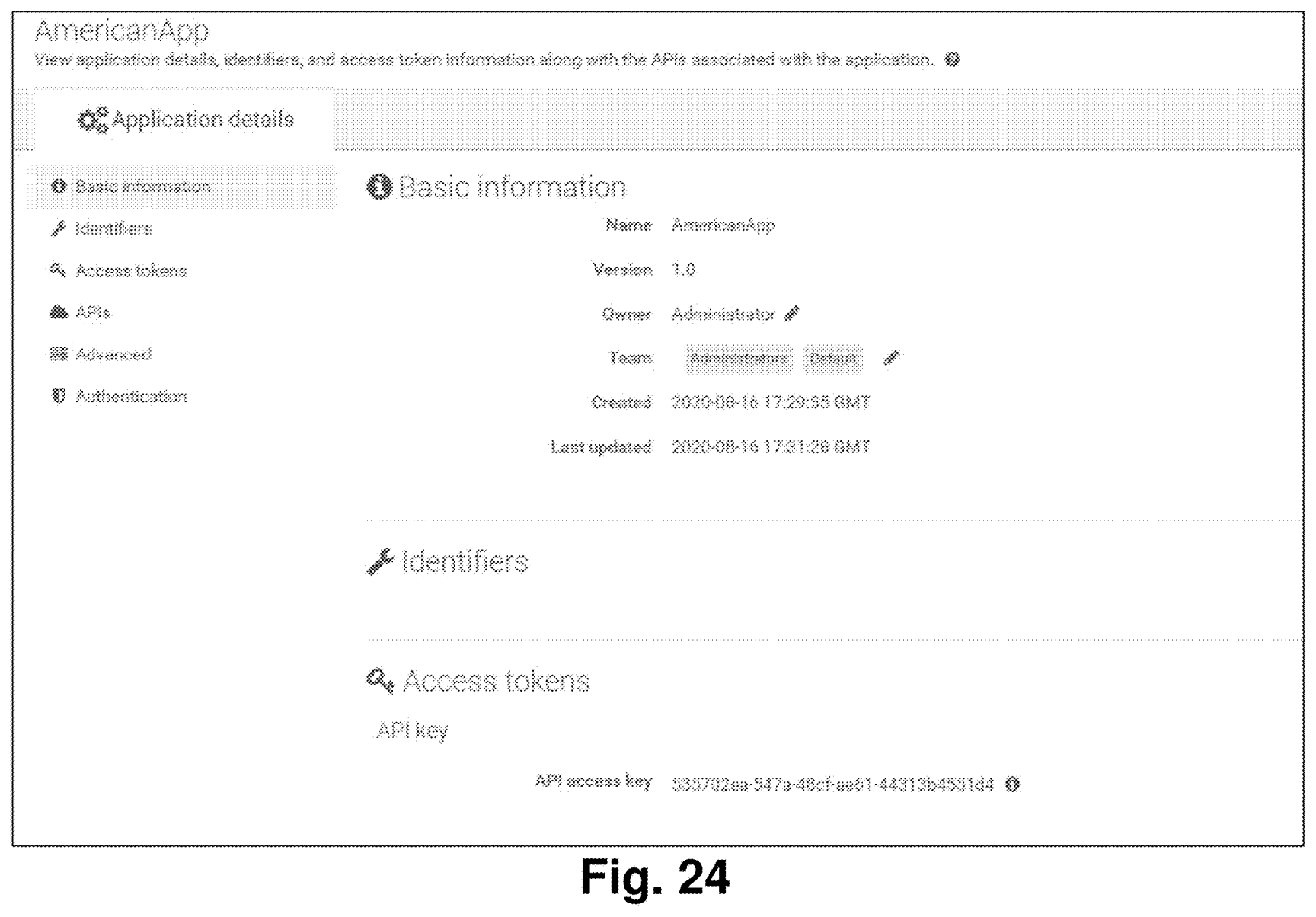

Fifth, an IAM policy is added to the API twin. The IAM policy can authenticate the API key and identify the application. An American App application also is created in API Gateway, e.g., as shown in FIG. 24. That is, FIG. 24 shows the basic information provided for an American App application usable in connection with the Brand LV microservice, in accordance with certain example embodiments. FIG. 24 is an example screenshot showing the name, version, and owner of the app, as well as basic CRUD-type information. Requests with the API key 535702ea-547a-48cf-ae61-44313b4551d4 will be identified as the "AmericanApp".

Sixth, a response transformation policy is added. The response transformation policy transforms the response from the Brand LV microservice into something new or newly formatted. FIG. 25 is an example screenshot showing an example response transformation policy being defined, in accordance with certain example embodiments. The FIG. 25 example shows configurations on this response transformation policy and thus contains information on what payload and application information is to be included. Here, it can be seen that the mask value references USD given the fact that this relates to the AmericanApp.

Seventh, a routing policy is added. This routing policy is configured to route the customized request to the Brand LV microservice (http://host:9092/product-service/products/). This Microgateway is now deployed to the pod, where the microservice resides.

Eighth, the deployment rewires the connectivity from the service mesh proxy to the microservice into a path from the service mesh proxy to the microgateway and then to the microservice. Here, there is no change to the service endpoint in terms of host, port, and URL context.

Figure 26:
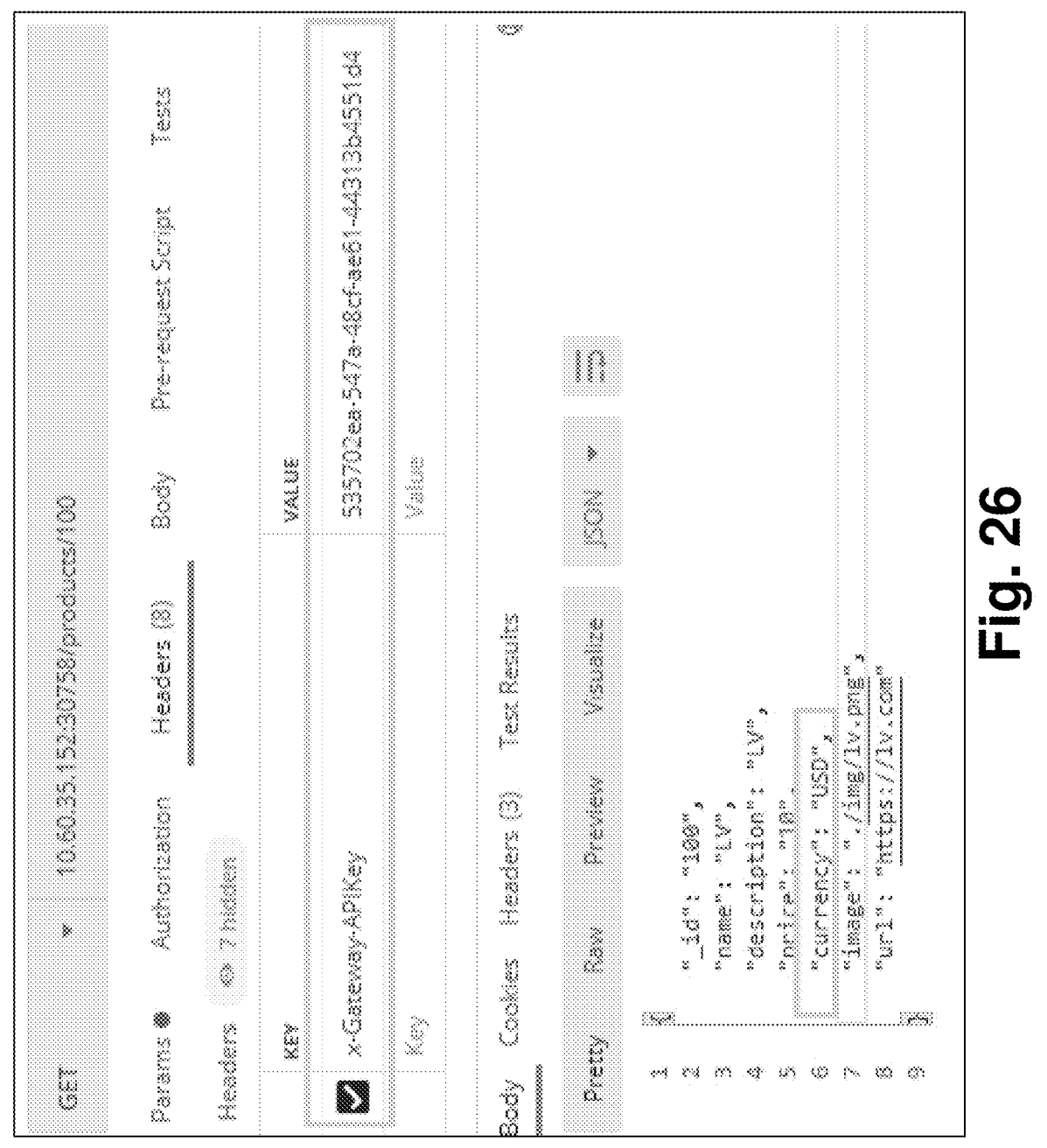

Ninth, the service consumers or API clients are still able to invoke the service with http://host:30758/product-service/products and an API key. The microgateway reads the token, identifies the caller, performs the requested transformation, and routes the request to the microservice. Upon receiving the response, it does the response transformation and reconstructs the response. FIG. 26 shows the URL call with the API key and the transformation in place, in accordance with certain example embodiments.

Although certain example embodiments describe APIs being invoked using URLs, it will be appreciated that the techniques described herein may have broader applicability. For instance, web service calls may be made in other ways, other electronic interfaces may be activated using parameters transmitted in other ways (e.g., in packets, files, or the like), etc.

A variety of different possible features may be enabled when application-level context is provided to microservices. This includes setting field-level masks based on geolocation, routing policies, enforcing access or other rights, etc. It will be appreciated that these are merely examples and additional enforcements and policies can be implemented using the techniques described herein.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of managing a service mesh, the method comprising:
having a service mesh proxy configured to route incoming requests to one or more microservices provided in a container pod;
for at least one of the one or more microservices, defining at least one API twin to be associated therewith, each API twin being definable to access application-level context information unavailable from the incoming requests and to enforce a policy based thereon;
instantiating a microgateway container for deployment within the container pod, the microgateway container, via instantiation, automatically pulling a definition for each API twin so as to enable policy enforcement for the associated microservice;
wherein the microgateway container, once deployed, is configurable to (a) automatically modify operation of the service mesh proxy to ensure that incoming requests that otherwise would be directed by the service mesh proxy to an end microservice having one or more API twins associated therewith instead will be automatically re-directed by the service mesh proxy to an appropriate one of these one or more API twins en route to the end microservice, and (b) automatically modify operation of each end microservice having one or more API twins associated therewith to ensure that outgoing responses therefrom that otherwise would be directed by each such end microservice to the service mesh proxy instead will be automatically re-routed to the microgateway en route to the service mesh proxy, wherein (a) and (b) are transparent to requestors; and
wherein incoming requests to the service mesh proxy have a first expected structure that is unchanged pre- and post-microgateway container runtime.

2. The method of claim 1, wherein (a) and (b) are performed during microgateway container startup.

3. The method of claim 1, wherein (a) and (b) are performed by changing port assignments included in a container pod definition.

4. The method of claim 1, wherein outgoing responses from the service mesh proxy have a second expected structure that is unchanged pre- and post-microgateway container runtime.

5. The method of claim 1, wherein the microgateway container instantiation includes modifying a container pod definition.

6. The method of claim 1, further comprising connecting the microgateway container to a master controller API gateway.

7. A non-transitory computer readable storage medium storing instructions that, when executed by a computer, are configured to perform the method of claim 1.

8. The method of claim 1, wherein the first expected structure includes a URL.

9. The method of claim 8, wherein the microgateway container is configured to route requests to an appropriate API twin based on path information extracted from a URL in a request.

10. The method of claim 8, wherein the microgateway container, once running, is configured to route requests to an appropriate API twin based on path information extracted from a URL in a request.

11. A service mesh management system operable in connection with a service mesh proxy configured to route incoming requests to one or more microservices provided in a container pod, the system comprising:
at least one processor and a memory, the at least one processor storing instructions executable by the at least one processor to perform operations including:
for at least one of the one or more microservices, defining at least one API twin to be associated therewith, each API twin being definable to access application-level context information unavailable from the incoming requests and to enforce a policy based thereon;
instantiating a microgateway container for deployment within the container pod, the microgateway container, via instantiation, automatically pulling a definition for each API twin so as to enable policy enforcement for the associated microservice;
wherein the microgateway container, once deployed, is configurable to (a) automatically modify operation of the service mesh proxy to ensure that incoming requests that otherwise would be directed by the service mesh proxy to an end microservice having one or more API twins associated therewith instead will be automatically re-directed by the service mesh proxy to an appropriate one of these one or more API twins en route to the end microservice, and (b) automatically modify operation of each end microservice having one or more API twins associated therewith to ensure that outgoing responses therefrom that otherwise would be directed by each such end microservice to the service mesh proxy instead will be automatically re-routed to the microgateway en route to the service mesh proxy, wherein (a) and (b) are transparent to requestors;
wherein incoming requests to the service mesh proxy have an expected structure that is unchanged pre- and post-microgateway container runtime.

12. The system of claim 11, wherein (a) and (b) are performed during microgateway container startup.

13. The system of claim 11, wherein (a) and (b) are performed by changing port assignments included in a container pod definition.

14. The system of claim 11, wherein the microgateway container instantiation includes modifying a container pod definition.

15. The system of claim 11, wherein the expected structure includes a URL.

16. The system of claim 15, wherein the microgateway container is configured to route requests to an appropriate API twin based on path information extracted from a URL in a request.

17. A method of operating a computing environment including a service mesh having a service mesh proxy configured to route incoming requests to one or more microservices provided in a container pod, the one or more microservices providing an application usable via the computing environment, the method comprising:
having a container pod;
automatically configuring the container pod to include a microgateway container and at least one API twin hosted within the microgateway container, the definition of each API twin associating the respective API twin with one of the one or more microservices, each API twin being operable to enforce a policy based on application-level context information retrieved by the respective API twin but unavailable from the incoming requests; and running the microgateway container so as to, in accordance with the configuration thereof, automatically modify operation of (a) the service mesh proxy to ensure that incoming requests that otherwise would be directed by the service mesh proxy to an end microservice having one or more API twins associated therewith instead will be automatically re-directed by the service mesh proxy to an appropriate one of these one or more API twins en route to the end microservice, and (b) each end microservice having one or more API twins associated therewith to ensure that outgoing responses therefrom that otherwise would be directed by each such end microservice to the service mesh proxy instead will be automatically re-routed to the microgateway en route to the service mesh proxy, wherein (a) and (b) are transparent to requestors;

wherein incoming requests to the service mesh proxy have a predefined structure that is unchanged pre- and post-microgateway container runtime.

18. The method of claim 17, wherein (a) and (b) are performed by changing port assignments included in a container definition.

19. The method of claim 18, wherein the predefined structure includes a URL.

20. The method of claim 17, wherein the microgateway container is connected to a master controller API gateway.

21. A non-transitory computer readable storage medium storing instructions that, when executed by a computer, are configured to perform the method of claim 17.

22. A computing environment comprising at least one processor and a memory storing instructions that, when executed by the computer, are configured to perform the method of claim 17.

* * * * *